US011582527B2

(12) United States Patent

McCartney, Jr. et al.

(10) Patent No.: US 11,582,527 B2
(45) Date of Patent: Feb. 14, 2023

(54) AUTOMATED VOICE TRANSLATION DUBBING FOR PRERECORDED VIDEO

(71) Applicant: GOOGLE LLC, Mountain View, CA (US)

(72) Inventors: Terrence Paul McCartney, Jr., Allison Park, PA (US); Brian Colonna, Pittsburgh, PA (US); Michael Nechyba, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 36 days.

(21) Appl. No.: 16/975,696

(22) PCT Filed: Feb. 26, 2018

(86) PCT No.: PCT/US2018/019779
§ 371 (c)(1),
(2) Date: Aug. 25, 2020

(87) PCT Pub. No.: WO2019/164535
PCT Pub. Date: Aug. 29, 2019

(65) Prior Publication Data

US 2020/0404386 A1 Dec. 24, 2020

(51) Int. Cl.
*H04N 7/10* (2006.01)
*H04N 21/488* (2011.01)
(Continued)

(52) U.S. Cl.
CPC ......... *H04N 21/4884* (2013.01); *G06F 40/30* (2020.01); *G06F 40/58* (2020.01); *H04N 21/43074* (2020.08)

(58) Field of Classification Search
CPC ......... H04N 21/4884; H04N 21/43074; H04N 21/2335; H04N 21/2343;
(Continued)

(56) References Cited

U.S. PATENT DOCUMENTS 6,505,153 B1 * 1/2003 Van Thong ............ H04N 5/278 704/211
7,013,273 B2 * 3/2006 Kahn ...................... G10L 15/26 704/235
(Continued)

FOREIGN PATENT DOCUMENTS

CN 101155291 A 4/2008
CN 103150329 A 6/2013
(Continued)

OTHER PUBLICATIONS

Office Action for Indian Patent Application No. 202047039935, dated Aug. 24, 2021, 5 pages.
(Continued)

*Primary Examiner* — Jefferey F Harold
*Assistant Examiner* — Sahar Aqil Riaz
(74) *Attorney, Agent, or Firm* — Lowenstein Sandler LLP

(57) ABSTRACT

A method for aligning a translation of original caption data with an audio portion of a video is provided. The method includes identifying, by a processing device, original caption data for a video that includes a plurality of caption character strings. The processing device identifies speech recognition data that includes a plurality of generated character strings and associated timing information for each generated character string. The processing device maps the plurality of caption character strings to the plurality of generated character strings using assigned values indicative of semantic similarities between character strings. The processing device assigns timing information to the individual caption character strings based on timing information of mapped individual generated character strings. The processing device aligns a translation of the original caption data with the audio portion of the video using assigned timing information of the individual caption character strings.

20 Claims, 11 Drawing Sheets

(51) Int. Cl.
*G06F 40/58* (2020.01)
*G06F 40/30* (2020.01)
*H04N 21/43* (2011.01)

(58) Field of Classification Search
CPC ......... H04N 21/234336; H04N 21/235; H04N 21/43072; G06F 40/30; G06F 40/58; G10L 15/26
USPC .......................................................... 725/32
See application file for complete search history.

(56) References Cited

U.S. PATENT DOCUMENTS

| | | | | |
|---|---|---|---|---|
| 9,462,230 | B1 * | 10/2016 | Agrawal | G06Q 50/20 |
| 9,696,881 | B2 * | 7/2017 | Pornprasitsakul | G11B 27/10 |
| 9,804,729 | B2 * | 10/2017 | Clark | G06F 3/048 |
| 2001/0025241 | A1 * | 9/2001 | Lange | G10L 15/26<br>704/235 |
| 2002/0143531 | A1 * | 10/2002 | Kahn | G10L 15/26<br>704/235 |
| 2007/0185704 | A1 * | 8/2007 | Yoshimura | G10L 21/04<br>704/E15.045 |
| 2011/0040559 | A1 | 2/2011 | Kim et al. | |
| 2013/0080384 | A1 * | 3/2013 | Briggs | G06F 16/433<br>707/610 |
| 2015/0317304 | A1 * | 11/2015 | An | G10L 15/26<br>386/285 |
| 2015/0350451 | A1 * | 12/2015 | Aue | G06F 40/58<br>379/202.01 |
| 2017/0278525 | A1 * | 9/2017 | Wang | G10L 25/84 |
| 2019/0007711 | A1 * | 1/2019 | Geva | H04N 21/84 |

FOREIGN PATENT DOCUMENTS

| | | | | |
|---|---|---|---|---|
| CN | 103646645 | B | | 3/2014 |
| CN | 104038804 | | * | 9/2014 |
| CN | 104038804 | B | | 9/2014 |
| CN | 104244081 | A | | 12/2014 |
| CN | 105848005 | A | | 8/2016 |
| CN | 106791913 | A | | 5/2017 |
| JP | 2008065653 | A | | 3/2008 |
| WO | 2016037440 | A1 | | 3/2016 |
| WO | 20170152935 | | | 8/2016 |

OTHER PUBLICATIONS

Office Action for Chinese Patent Application No. 201880090248.8, dated Sep. 1, 2021, 23 pages.
PCT International Search Report and Written Opinion for International Application No. PCT/US2018/019779, dated Jan. 15, 2019, 27 pages.
Office Action for Indian Patent Application No. 2022/48016067, dated Jul. 29, 2022, 5 pages.

* cited by examiner

200

Identify original caption data for a video that comprises a plurality of caption character strings associated with an audio portion of the video
205

Identify speech recognition data generated for the audio portion of the video comprising a plurality of generated character strings and associated timing information for each generated character string
210

Map the plurality of caption character strings to the plurality of generated character strings using assigned values indicative of semantic similarities
215

Assigning timing information to the individual caption character strings based on timing information of mapped individual generated character strings
220

Aligning a translation of the original caption data with the audio portion of the video using the assigned timing information of individual caption character strings and detected speech segment time intervals
225

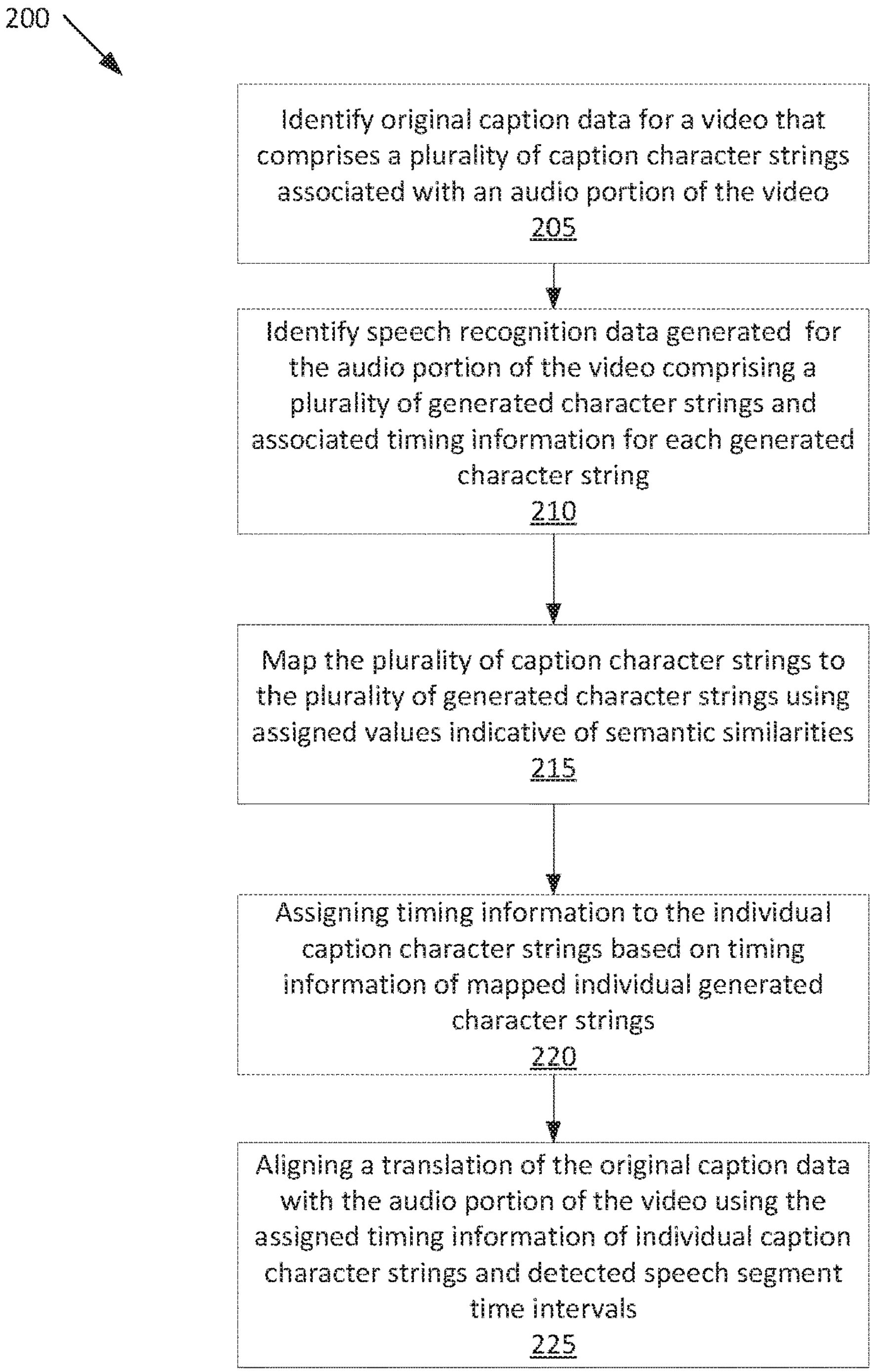

FIG. 2

Table 505

515 520 525

| Integer ID | Character string | Assignment method |
|---|---|---|
| 349 | mean | Common set clustered |
| 350 | men | Caption character string seed |
| 351 | man | Generated character string clustered |
| | | |
| 1400 | moneys | Generated character string clustered |
| 1401 | | |
| 1402 | monies | Caption character string seed |
| 1403 | movies | Common set clustered |
| | | |
| 4350 | alright | Generated character string clustered |
| 4351 | | |
| 4352 | light | Caption character string seed |
| | | |
| 7699 | bold | Generated character string clustered |
| 7700 | old | Common set clustered |
| 7701 | told | Caption character string seed |
| 7702 | hold | Common set clustered |
| | | |
| 21152 | unimportance | Common set clustered |
| 21153 | | |
| 21154 | importance | Generated character string seed |
| 21155 | | |
| 21156 | | |
| 21157 | importantly | Generated character string clustered |

| | Caption Character String | Generated Character String |
|---|---|---|
| | we | we |
| | re | re |
| | dealing | dealing |
| | with | with |
| | a | a |
| | graph | graph |
| 532 | of | |
| 532 | | and |
| | many | many |
| | inputs | inputs |
| | that | that |
| | we | we |
| | look | look |
| 534 | to | |
| 534 | | on |
| | illustrate | illustrate |

540

| Caption Character String | Generated Character String |
|---|---|
| a | |
| silly | |
| act | |
| | celiac |
| is | is |
| a | a |
| veggie | veggie |

550

| | Caption Character String | Generated Character String |
|---|---|---|
| | let | |
| | s | |
| | | get |
| | start | started |
| 552 | come | |
| 552 | on | |
| 552 | | c |
| 552 | | mon |

560

| Caption Character String | Generated Character String | |
|---|---|---|
| basin | besan | |
| or | or | |
| chickpea | | |
| | chick | |
| | pea | |
| flour | flour | |
| and | and | |
| it | it | |
| is | is | |
| fried | fried | |
| so | | 565 |
| with | | 565 |
| the | | 565 |
| chuck | | 565 |
| knee | | 565 |
| | served | 565 |
| | with | 565 |
| | chutney | 565 |
| sauce | sauce | |

| Caption character string | Start/End time | Duration | Confidence |
|---|---|---|---|
| besan | [2:07.22, 2:08.45] | 1229 ms | 0.72 |
| or | [2:08.45, 2:08.63] | 181 ms | 1.00 |
| chick | [2:08.63, 2:09.35] | 719 ms | 0.81 |
| pea | [0:00.00, 0:00.00] | 0 ms | 0.00 |
| flour | [2:09.35, 2:09.53] | 180 ms | 1.00 |
| and | [2:09.53, 2:10.04] | 510 ms | 1.00 |
| it | [2:10.04, 2:11.27] | 1230 ms | 1.00 |
| is | [2:11.27, 2:11.39] | 120 ms | 1.00 |
| fried | [2:11.72, 2:12.49] | 329 ms | 0.72 |
| served | [2:12.49, 2:12.08] | 660 ms | 0.18 |
| with | [2:12.08, 2:12.21] | 270 ms | 1.00 |
| chutney | [2:12.21, 2:13.07] | 90 ms | 0.34 |
| sauce | [2:13.07, 2:13.97] | 900 ms | 1.00 |

575 (chick, pea)

FIG. 5C

AUTOMATED VOICE TRANSLATION DUBBING FOR PRERECORDED VIDEO

BACKGROUND

Translating speech in a video from an originally recorded language to another language may involve labor-intensive efforts of voice dubbing translated audio portions onto the original video. Generally, voice dubbing refers to combining additional or supplementary recordings (dubbed speech) with originally recorded speech to create the finished soundtrack for the video. However, the dubbed speech may differ from the originally recorded speech and may not align with start and end times of the originally recorded speech. As a result, the translated audio may appear out of sync and may not be appealing to viewers.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementation of the disclosure may include a method to identify, by a processing device, original caption data for a video, where the original caption data comprises a plurality of caption character strings associated with an audio portion of the video. The processing device may identify speech recognition data generated for the audio portion of the video, where the speech recognition data comprises a plurality of generated character strings and associated timing information for each generated character string. The processing device may map the plurality of generated character strings using assigned values indicative of semantic similarities between individual caption character strings of the plurality of caption character strings and individual generated character strings of the plurality of generated character strings. The method may further assign timing information to the individual caption character strings based on timing information of mapped individual generated character strings. The processing device may align a translation of the original caption data with the audio portion of the video using assigned timing information of the individual caption character strings.

Implementation of the disclosure may include a method to generate translated audio speech for the translation of the original caption data. The translated audio speech may be machine-generated audio speech containing a set of translated audio speech segments. The method may further include overlaying the translated audio speech segments of the set of audio speech segments onto video segments of the video that correspond to time intervals for each of the translated audio speech segments. The method may further include generating a second video containing a video portion of the video and a translated audio portion comprising the overlaid translated audio speech segments.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2 depicts a flow diagram of a method for assigning timing information to original caption data and aligning a translation of the original caption data with an audio portion of the video content item using the assigned timing information, according to some aspects of the disclosure.

FIG. 5A is an illustrative example of assigned values for a plurality of caption character strings and a plurality of generated character strings, according to some aspects of the disclosure.

FIG. 5B is an illustrative example of sequential matching pairs generated from a sequence of caption character strings and a sequence of generated character strings, according to some aspects of the disclosure.

FIG. 5C illustrates an example table of individual caption character strings with assigned timing information, according to some aspects of the disclosure.

DETAILED DESCRIPTION

Figure 1:
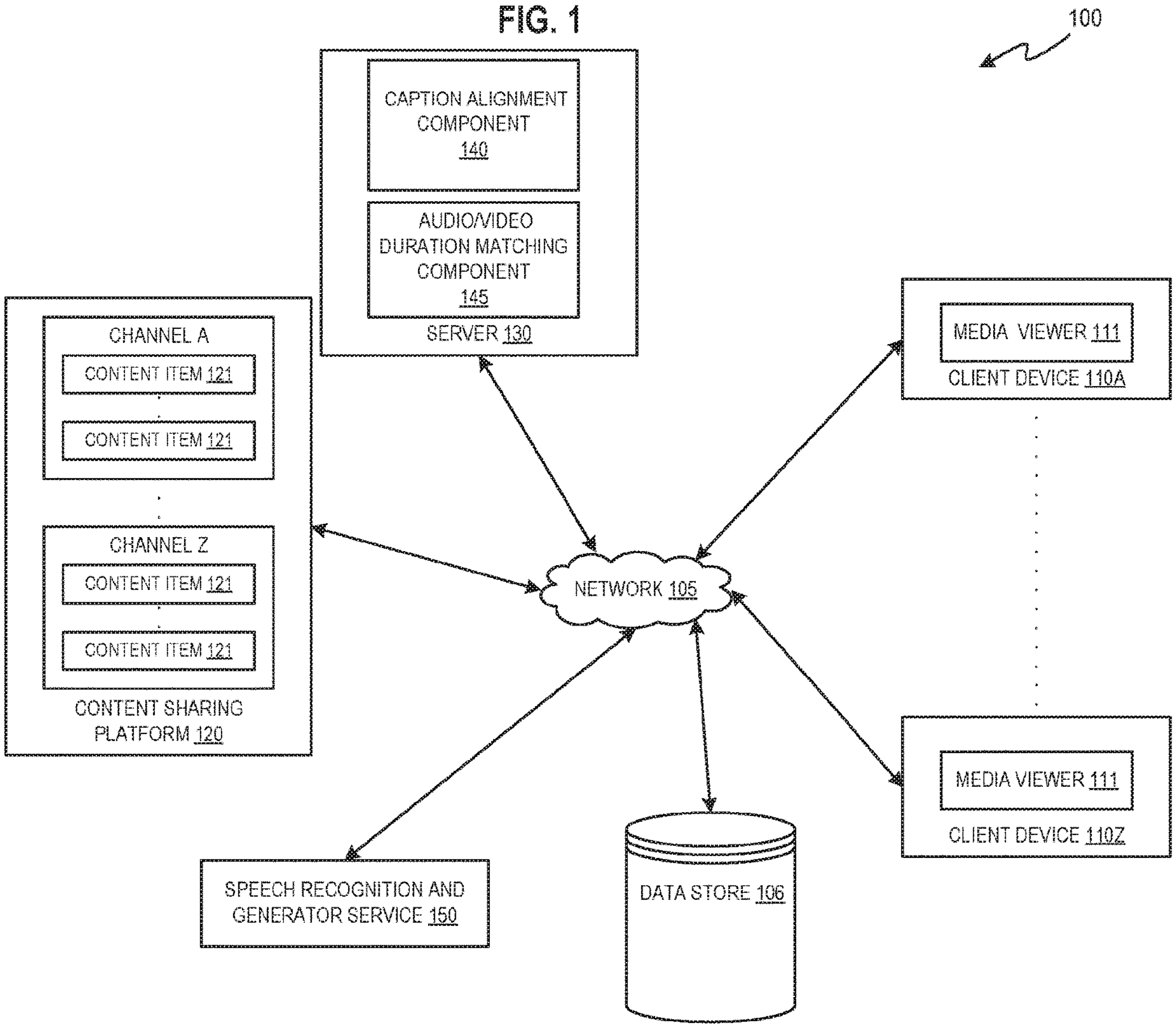
FIG. 1 illustrates an example system architecture, in accordance with some aspects of the disclosure.

Aspects of the present disclosure relate to aligning translated caption data to an audio portion of a video using timing information of individual caption character strings from the original caption data. The translated caption data may be used to overlay dubbed translations of speech onto the video to generate a translated version of the video. The original video and the translated version of the video may be stored within a content sharing platform for media content items. Users of client devices may query and retrieve the translated version of the video for playback on their respective client devices. The client devices may include, but are not limited to, a personal computer, a tablet, a smartphone, or any other computing device.

Videos stored on the content sharing platform may have audio that includes speech recorded in an original language that is different from the desired language of the user viewing the video. For example, a video on the content sharing platform may include speech recorded in English; however, the user may only understand Japanese and therefore would like to view the video in Japanese. Many professionally produced videos may include different audio soundtracks that specify speech in different languages. Producers of these professionally produced videos may use voice actors to generate foreign language tracks for viewers who speak foreign languages. However, the use of voice actors to produce alternate language tracks is a time consuming and expressive process. The cost may further increase with the number of different foreign language versions desired for a specific video.

An alternative to using voice actors to generate foreign language versions of videos is to provide foreign language subtitles with a video. Foreign language subtitles may then be overlaid onto the video to display the foreign language translation of spoken words within the video. However, the major drawback to simply providing foreign language subtitles is that the viewer is required to read the subtitles while the video is playing. This extra effort on the part of the viewer may take the user's focus away from the content displayed within the video. For example, if the viewer is viewing a "how-to" video on car repair, then it would be beneficial for the viewer to pay attention to the steps shown within the video rather than focusing on the foreign language subtitles provided.

Technologies may be available to use computer generated speech that takes as input the foreign language subtitles and generates speech to be overlaid onto the original video. However, synchronizing durations of the automatically generated foreign language speech to the original speech may be problematic and may result in foreign language speech that either begins or ends too early or too late. Synchronization issues of automatically generated foreign language speech may occur when timing information from subtitles is used to determine timing intervals of overlaid foreign language speech. For example, timing information associated with subtitles (caption timing) may be related to when the subtitles are to be displayed onto the video. Typically, subtitles are displayed before a speaker in the video speaks and remain displayed after the speaker finishes speaking. The reason for this is to ensure that the viewer has enough time to read the text within the displayed subtitles. When subtitles are converted into speech for foreign language dubbing, the duration of the converted speech may not match the duration of the original speech in the video. As a result, synchronizing foreign language speech based upon caption timing (as done conventionally) may cause inaccurate speech overlays that may result in undesirable videos with inaccurate speech timings.

Aspects of the present disclosure address the above and other deficiencies by using speech recognition data associated with original language together with caption data associated with the original language to assist in determining how to match the translated speech to the audio portion of the video. Speech recognition data may include automatically generated speech data in the form of generated character strings that include timing information for each generated character string. The generated character strings may represent words and/or phrases from the originally spoken dialogue in the video content item. For example, automatically generated speech data may be a transcript of the originally spoken dialogue from a video where each word has associated timing information describing the start and end times of the word. Generated speech data may include errors such as misidentified words within speech. In order to improve on such errors, original caption data, that includes caption character strings representing the originally spoken words in the video, may be used in conjunction with the generated speech data. The original caption data may include a transcript of originally spoken dialogue provided from caption text used for captioning the video content item.

The caption character strings within the original caption data may be mapped to the generated character strings in the speech recognition data in order to assign timing information from the generated character strings to the caption character strings of the original caption data. Mapping caption character strings to the generated character strings may be performed using values assigned to individual caption character strings and individual generated character strings that are indicative of semantic similarities between the individual caption character strings and the individual generated character strings. By doing so, the accuracy of the speech from the original caption data may be combined with the accuracy of timing information from the speech recognition data in order to align the original caption data to the audio portion of the video.

Once the caption character strings within the original caption data is mapped to the generated character strings in the speech recognition data and the timing information from the generated character strings is assigned to the caption character strings of the original caption data, the original caption data and the assigned timing information can be used to align translated caption data (for a language other than the original caption data) with the audio portion of the video. Translated caption data may include translated character strings associated with audio portion of the video.

As part of the aligning process, caption sentence fragments may be generated from the caption character strings of the original caption data based on punctuation in the caption character strings. In addition, translated sentence fragments may be generated from the translated character strings of the translated caption data based on punctuation in the translated character strings. Caption sentence fragments may be mapped to corresponding translated sentence fragments based on timing associated with the original caption data and the translated caption data. Mapping sentence fragments of original caption data to corresponding sentence fragments of translated data, rather than mapping individual character strings from the original caption data to corresponding individual character strings of the translated caption data, conserves processing resources because mapping between individual character strings would involve a deep understanding of the meaning of the character strings in both the original caption data and the translated caption data in order to determine one to one correspondence between the original character strings and the translated character strings. Determining original caption data to translated caption data correspondence at the character string level would consume significant operations to ensure proper alignment of caption data at the character string level.

For each resulting caption sentence fragment, a time interval covering the caption sentence fragment can be estimated using the assigned timing information of the individual caption character strings in the caption sentence fragment. Time intervals may be assigned to individual translated sentence fragments based on estimated time intervals of mapped individual caption sentence fragments. Translated sentences may be generated from consecutive translated sentence fragments based on punctuation. Each translated sentence may have timing information that is defined by the assigned time intervals of the translated sentence fragments included in the respective translated sentence. The translated sentences may be aligned with the audio portion of the video using the timing information of each translated sentence.

In some implementations, foreign language dubbing uses translated audio speech that is machine-generated speech for the translation of the original caption data. The translated audio speech includes translated audio speech segments that can be overlaid onto video segments of the video that correspond to time intervals for each of the translated audio speech segments. The resulting video may contain the original video portion and a translated audio portion including the overlaid translated audio speech segments.

Aspects of the present disclosure provide accurate alignment of translated audio portions generated from translated caption speech with durations and timings of original audio speech in the video. As a result, dubbed audio is smoothly integrated onto the video, thereby improving user viewing experience and increasing user interest in foreign language dubbed videos.

FIG. 1 illustrates an example system architecture 100, in accordance with one implementation of the disclosure. The system architecture 100 includes client devices 110A through 110Z, a network 105, a data store 106, a content sharing platform 120, a server 130, and a speech recognition and generation service 150. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, network connected televisions, netbook computers etc. In some implementations, client device 110A through 110Z may also be referred to as "user devices." Each client device includes a media viewer 111. In one implementation, the media viewers 111 may be applications that allow users to view content, such as videos. For example, the media viewer 111 may be a web browser that can access, retrieve, present, and/or navigate content (e.g., web pages such as Hyper Text Markup Language (HTML) pages, digital media items or content items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media content items, such as digital videos.

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that communicate with the server 130.

Functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as content items) and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media content items 121. Examples of a media content item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media content item 121 is also referred to as a video content item.

A media content item 121 may be consumed via the Internet and/or via a mobile device application. As used herein, "media", "media item," "online media item," "digital media," "digital media item," "content," "content item," and "video content item" can include an electronic file that can be executed or loaded using software, firmware or hardware configured to present the digital media item to an entity. In one implementation, the content sharing platform 120 may store the media content items 121 using the data store 106.

In one implementation, the speech recognition and generation service 150 may be one or more computing devices (e.g., a rackmount server, a server computer, etc.) configured to generate speech recognition data by analyzing audio from a video content item to identify spoken language within the video. The speech recognition and generation service 150 may implement automatic speech recognition (ASR), speech-to-text (STT), or any other speech recognition algorithms configured to recognize spoken dialogue in audio. The speech recognition data may include a plurality of generated character strings, each representing one or more spoken words from the audio portion. Each generated character string may include audio timing that identifies the start and end time of the generated character string within the audio portion. For example, if the speech recognition and generation service 150 analyzes a video that contains audio with spoken speech of "Hello world," then the speech recognition and generation service 150 may implement ASR to generate speech recognition data containing generated character strings from "Hello world" as "hello" and "world." The generated character strings may have associated timing information that indicates that "hello" starts at 0:05 seconds and ends at 0:07 seconds in the video. Similarly the "world" character string may have timing information indicating that "world" starts at 0:07 seconds and ends at 0:08 seconds. The speech recognition and generation service 150 may be configured to recognize multiple different spoken languages within video content items.

In one implementation, the speech recognition and generation service 150 may be configured to generate computerized audio of spoken dialogue using caption data. For example, the speech recognition and generation service 150 may receive caption data of a transcript of a conversation between two different people. The speech recognition and generation service 150 may associate two different computer generated voices to the caption data and then generate audio representing the conversation using the caption data as input. The speech recognition and generation service 150 may be configured to input caption data in different languages and generate audio portions for the speech in the language of the input caption data. For example, the speech recognition and generation service 150 may receive a sentence in Japanese and may synthesize the sentence into audio that represents a computer voice speaking the Japanese sentence.

In one implementation, the server 130 may be one or more computing devices (e.g., a rackmount server, a server computer, etc.). The server 130 may be included in the content sharing platform 120 or be part of a different system. The server 130 may host a caption alignment component 140 and an audio/video duration matching component 145. The caption alignment component 140 may be configured to align caption data to speech recognition data based upon semantic similarities of character strings within the caption data and the speech recognition data. For example, the caption alignment component 140 may receive a request to align original caption data, representing a caption transcript of audio from a particular video content item, to speech recognition data, representing automatically recognized speech from the particular video content item. The caption alignment component 140 may use semantic similarities within character strings from the original caption data and the speech recognition data to determine matching character string sequences and generate mapping information for the matched character string sequences. For example, if the caption alignment component 140 determines that the phrase "this is really cool" from the original caption data matches the same phrase "this is really cool" in the speech recognition data, then the caption alignment component 140 may generate mapping information that maps the caption character strings that make up "this is really cool" to the corresponding generated character strings from the speech recognition data. By doing so, the caption alignment component 140 may assign the timing information associated with the individual generated character strings to the corresponding individual caption character strings.

In one implementation, the caption alignment component 140 may align caption character strings from original caption data to translated caption data. Translated caption data may represent a translation transcript of the spoken dialogue in the audio portion of a video content item. The caption alignment component 140 may use translation resources, such as a dictionary, a language database or other translation service, to determine how to align the original caption data, which is in one language, to the translated caption data, which is in another language. For example, a translation service may provide a translation of words, phrases and/or sentences in one language to another language, and the caption alignment component 140 can identify those words, phrases and/or sentences in the original caption data and their translated versions in the translated caption data to perform the alignment.

In one implementation, the audio/video matching component 145 may be configured to determine duration differences between translated audio portions of speech and original audio portions of speech from a video. The audio/video matching component 145 may be configured to adjust the rate of the translated audio portion, the rate of video portions in the video content item, and/or both in order to align the durations of the translated audio portion of speech to the original audio portions of speech for dubbing purposes. By adjusting the audio rate of the translated portion of speech and/or the video rate, the audio/video matching component 145 may seamlessly overlay the translated audio portions onto corresponding video portions in the original video content item such that the translated audio portions align with the original speech.

Various methods related to various aspects of the present disclosure will now be discussed in more detail. In general, the methods may be performed by processing logic that may comprise hardware (e.g., processing device, circuitry, dedicated logic, programmable logic, microcode, etc.), software (e.g., instructions run on a processing device), or a combination thereof. In some implementations, the methods may be performed by the components within the server 130. In alternative implementations, some of the methods may be performed also using the speech recognition and generation service 150 and/or the media viewer 111 of FIG. 1.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

FIG. 2 depicts a flow diagram of aspects of a method 200 for assigning timing information to caption character strings for original caption data and aligning a translation of the original caption data with an audio portion of the video content item using the assigned timing information.

At block 205, processing logic may identify original caption data for a video content item. The original caption data includes a plurality of caption character strings associated with an audio portion of the video content item. In an implementation, processing logic may retrieve original caption data from the data store 106 which may store video content items and their associated original caption data. The original caption data may represent a transcript of the audio portion (e.g., speech) for the video content item. The original caption data may be formatted to include sentences or fragments that represent spoken words from a speaker in the video and associated caption timing information that indicates when the caption is to be displayed in the video. For example, if a first person in the video speaks "Hello world!" then the original caption data may include a sentence that represents "Hello world!" as two caption character strings, one representing "Hello" and another representing "world!" A caption character string may represent a word, phrase, or set of characters. Caption timing information in the original caption data may indicate when to display the sentence "Hello world!" on the screen. The caption timing information may not necessarily align to when the first person begins speaking the phrase "Hello world!" Instead the caption timing information may be configured to display the caption such that a viewer has enough time to read the caption. For instance, the caption timing information may display the caption 1 or a ½ second before the first person in the video begins speaking. Start and end times from the caption timing information may vary based upon the size of the caption. For this reason the caption timing information may not be an accurate indicator as to when the speaker begins speaking in the video.

At block 210, processing logic may identify speech recognition data generated for the audio portion of the video content item. In an implementation, processing logic may request speech recognition data from the speech recognition and generation service 150. The speech recognition and generation service 150 may generate upon request or may have previously generated the speech recognition data for the video content item and may have stored the speech recognition data within the data store 106. The speech recognition data may represent automatically recognized speech or other audio from the video content item. The speech recognition data may include a plurality of generated character strings, where each individual generated character string represents a word, phrase, or set of characters spoken by a speaker within the video content item. Each generated character string within the speech recognition data may by associated with timing information that represents the specific time at which the generated character string was spoken within the video. Using the above example, the timing information for the phrase "Hello world!" may include timing for when the word "hello" is spoken and timing for when the word "world" is spoken. The timing information may include specific start and end times for each generated character string or may include a specific start time and duration information for each generated character string.

At block 215, processing logic may map the plurality of caption character strings from the original caption data to the plurality of generated character strings from the speech recognition data using assigned values that are indicative of semantic similarities between individual caption character strings and individual generated character strings. In an implementation, processing logic may assign integer identifiers (ID) to each unique character string within the plurality of caption character strings and the plurality of generated character strings. The integer IDs may be used to determine semantic similarities between character strings based upon a word edit distance value that represents the number of instructions needed to transform one word to another. Instructions to transform one word to another may include instructions such as letter substitutions, letter additions, letter removals, and adjacent letter switching. In other implementations, identifiers other than integer IDs may be assigned to each unique character string within the plurality of caption character strings and the plurality of generated character strings.

Some aspects of mapping the plurality of caption character strings to the plurality of generated character strings by assigning values to each unique caption character string and generated character string and determining matching sequences of caption character strings and generated character strings are discussed in more detail below in conjunction with FIGS. 3A and 3B.

Referring to FIG. 2, at block 220, processing logic assigns timing information to the individual caption character strings based on timing information of mapped individual generated character strings. FIG. 5C illustrates an example table of individual caption character strings with assigned timing information. Table 570 contains start and end timing referring to timing of the audio portion associated with the video content item, duration timing for each individual caption character string, and confidence information based upon the speech recognition data. Confidence information refers to confidence values that may be assigned to each caption character string based upon how accurately the caption character string matched to the corresponding generated character string. For example, if matching is an exact match based on the integer ID values, then the confidence value may be set to 1. Alternatively, if the matching is a partial matching or a matching inferred based on adjacent caption character strings, then the confidence value may be set to a proportionally lower value.

As shown in FIG. 5C, character string 575 refers to the word "pea" and was not previously mapped to a corresponding generated character string. As a result, the timing information is set to zero. Processing logic may infer timing information for character string 575 based upon adjacent character strings. For example, the end time of the preceding character string "chick" may be applied to the end time of character string 575 "pea" as the actually spoken dialogue may include the word "chickpea" instead of the strings "chick" and "pea".

Referring to FIG. 2, at block 225, processing logic aligns a translation of the original caption data with the audio portion of the video content item using the assigned timing information of individual caption character strings of the original caption data and detected speech segment time intervals. Translations of the original caption data may include, but are not limited to, translated language captions and machine translated dialogue generated from the speech recognition and generation service 150. Translated language captions may include text translations generated from crowd source users or professional translators. Machine translated dialogue generated by the speech recognition and generation service 150 may be generated by providing, to the speech recognition and generation service, the original caption data for translation or portions of the original caption data, such as individual sentences or sentence fragments, for translation.

Figure 3A:
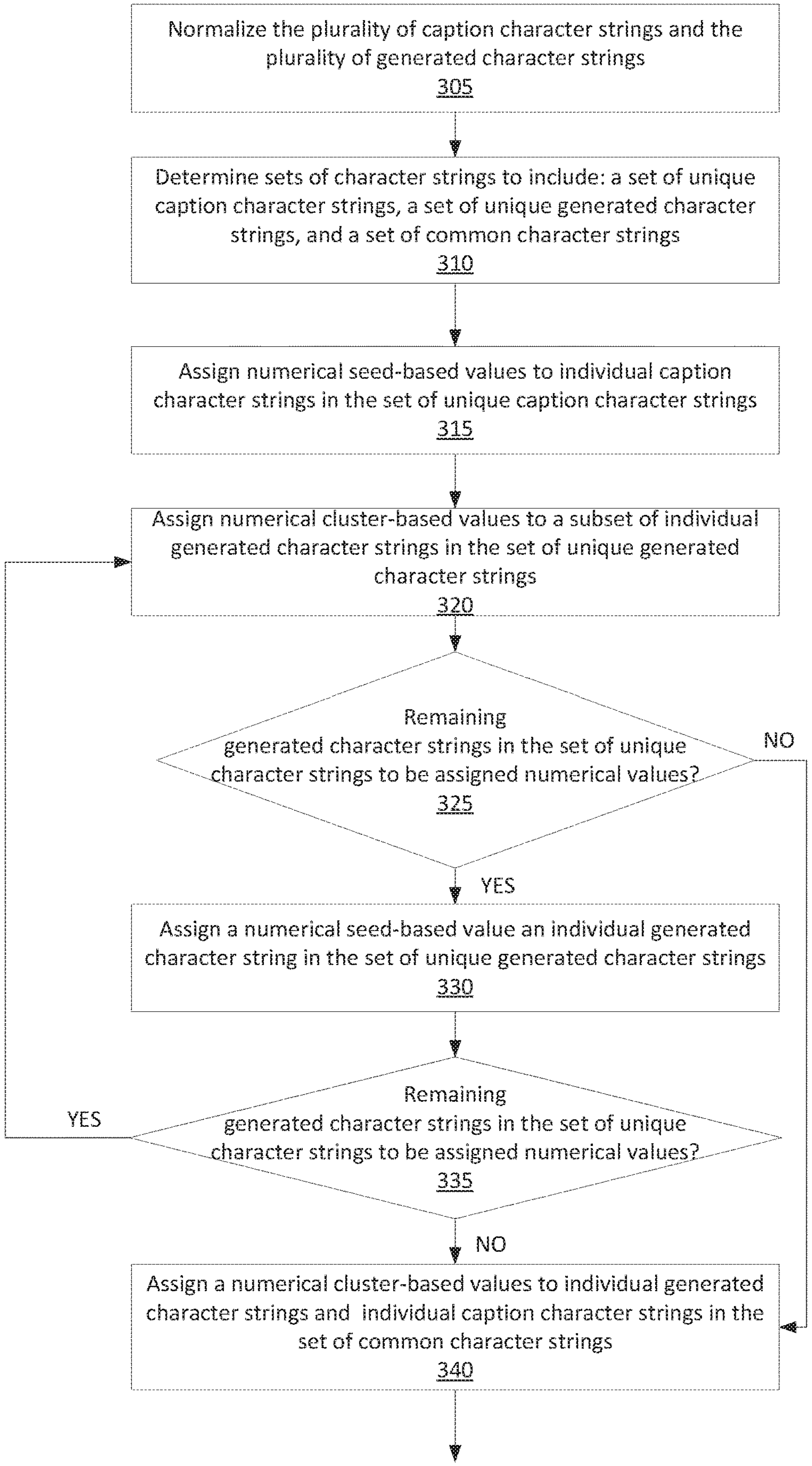
FIG. 3A illustrates an example method of assigning values to each unique caption character string and unique generated character string, according to some aspects of the disclosure.

FIG. 3A illustrates a process of assigning values to each unique caption character string and generated character string. At block 305, processing logic may normalize the caption character strings in the original caption data and the generated character strings in the speech recognition data by removing slight character variances to efficiently match corresponding caption character strings and generated character strings. Caption character strings in the original caption data may be formatted to help viewers of a video understand the spoken dialogue as well as other aspects of a video. For example, the original caption data may include additional non-spoken text or special characters used to indicate who is speaking, such as "Mary: Hi, it's a great day," where "Mary:" indicates the speaker of the phrase. Other non-spoken text may include indications of sound effects within the video, such as "music playing" or "BANG" each of which may represent a sound in the video. The sound effect captions are useful for deaf and hard of hearing viewers that may not otherwise be aware of the additional sounds in the video. For the purposes, of aligning spoken dialogue, non-spoken text may be removed during normalization.

In an implementation, processing logic may implement regular expression matching to identify and remove prefix labels from caption character strings and generated character strings. For example, a set of caption character strings may include ">>Fred: How are you". Processing logic may identify and remove the non-spoken text ">>Fred:" from the set of caption character strings, resulting in "How are you". In an embodiment, processing logic may implement regular expression matching to remove annotations that indicate audio descriptions. For example, a caption character string of "[music]" may be removed as not being a part of spoken dialogue.

In an implementation, caption character strings and generated character strings may represent languages other than English. Other languages, such as Hindi or Japanese use different sentence punctuation. Processing logic may be configured to normalize punctuation to a single type of punctuation. For example, punctuation for different languages may be normalized to English in order to accurately align sequences of caption character strings to generated character strings and determine sentence and sentence fragment boundaries. For example, caption character strings that represent Hindi dialogue may contain "।" for sentence breaks. Processing logic may identify these sentence breaks and replace the Hindi sentence breaks with English periods. Processing logic may be configured to use any language as the normalization punctuation language or may be configured to assign special characters to represent sentence punctuation.

In an implementation, processing logic may be configured to infer sentence punctuation based upon patterns with the caption character strings and generated character strings. For example, original caption data provided by crowd-sourced captioning may lack proper punctuation. Processing logic is configured to infer sentence punctuation, such as periods, based upon other queues, such as extra spacing between words or a capitalized word that is in the middle of a sequence of words. These queues may indicate the start of a new sentence. Processing logic may be configured to insert periods at places where extra spacing occurs or where a subsequent caption is capitalized.

In an implementation, processing logic may be configured to normalize character strings in the plurality of caption character strings and the plurality of generated character strings by converting letter case, removing leading or trailing punctuation, separating hyphenated words, and/or separating word contractions. For example, generated character strings from the speech recognition and generation service 150 may contain unnecessary hyphenated words or may display words as contractions when they should not be using contractions, which may be removed by processing logic.

Upon normalizing each of the sequences of caption character strings and generated character strings, integer IDs may be assigned to each of the unique character strings. The integer IDs represent values within and integer edit distance space where integer IDs are arranged with respect to a relative word edit distance between associated words. Word edit distance values represent the number of instructions needed to transform one word to another. For example, the word edit distance value for words "mean" and "men" would equal one because only one transformation instruction, removal of "a" from "mean", is required to transform "mean" to "men". By representing each character string within an integer edit distance space, character strings may be arranged within a single dimensional space. Using a single dimensional space assignment of integer IDs to character strings may be based upon determining a set of unique character strings within both sequences of the caption character strings and the generated character strings.

At block 310, processing logic determines that the set of characters strings from the caption character strings and generated character strings includes a set of unique caption character strings, a set of unique generated character strings, and a set of common character strings. The set of unique caption character strings may represent character strings that are only found within the sequence of caption character strings. The set of unique generated character strings may represent character strings that are only found within the sequence of generated character strings. The set of common character strings represent character strings that are found with the sequence of caption character strings and the sequence of generated character strings.

In an implementation, character strings within the sequence of caption character strings represent a transcript of spoken dialogue from the video and may be a more accurate representation of the spoken dialogue than the generated character strings from the speech recognition data. As described, speech recognition data contains mostly accurate timing information for each generated character string but may contain slight errors that may have occurred when identifying spoken dialogue. As a result, processing logic may treat the set of unique caption character strings as character strings more likely to represent the spoken dialogue within the video content item.

At block 315, processing logic may assign integer IDs to each of the character strings within the set of unique caption character strings. In an implementation, each of the character strings in the set of unique caption character strings are treated as seed character strings within the integer edit distance space. Seed character strings are character strings that are determined to represent likely words or phrases spoken in the video content item. The integer IDs assigned to each of the unique caption character strings are spaced apart such that the integer edit distance values between the unique caption character strings are beyond an edit distance value threshold for matching characters strings that have similar semantics. For example, if the set of unique caption character strings includes {light, men, monies, told}, processing logic may assign integer IDs as {light=4352, men=350, monies=1402, told=7701}. The values of the assigned integer IDs are spaced far enough apart that the number of edit instructions needed to change one unique caption character string to another unique caption character string is large enough to ensure that unique caption character strings are not mistakenly matched to each other or to slight character string variances of each other.

In an implementation, the spacing between integer ID values of the unique caption character strings allows for clustering of unique generated character strings that may have slight character differences between the generated character strings and the caption character strings. At block 320, processing logic may assign integer ID values to at least a subset of unique generated character strings in the set of unique generated character strings. Assignment of integer ID values to at least the subset of unique generated character strings may be based upon determining which unique generated character strings from the set of unique generated character strings are within a threshold of an integer edit value. Integer edit values within the integer edit value threshold may indicate that a generated character string is sufficiently close to a caption character string and may be recognized as a variant of the caption character string. For example, the generated character string "man" may be identified as being sufficiently close to the caption character string "men" which has been assigned integer ID value 350, at block 315. In this case, processing logic may calculate that the integer edit distance value between "men" and "man" is one and therefore processing logic may assign, to the generated character string, an integer ID value of 351, which is one more than the integer ID value for "men" (350). In an implementation, the integer edit value threshold for determining closeness between two character strings may be based upon the size of the caption character string and the type of edit instructions needed to make an exact match. For example, if the caption character string is short, such as "men," then the edit distance value threshold may be smaller for "men" than an edit distance value threshold for a caption character string such as "unimportance", where longer character strings may allow for a larger edit distance value threshold when determining that two character strings are relatively close.

The operations performed in block 320 may include assigning integer ID values to a subset of generated character strings. The subset of generated character strings within the set of unique generated character strings may be assigned integer ID values by treating the subset of generated character strings as character strings that have a similarity to already assigned integer IDs; therefore assignment of integer ID values to the subset of generated character strings is based on a clustering technique of assigning integer ID values based on already assigned integer ID values for similar character strings. At decision block 325, processing logic determines whether there are additional unique generated character strings within the set of unique character strings that need integer ID value assignment. If there are additional unique generated character strings to be assigned integer ID values, then processing logic proceeds to block 330 to assign integer ID values to the additional unique generated character strings. If there are no additional unique generated character strings to be assigned integer ID values, then processing logic proceeds to block 340 to assign integer ID values to the character strings within the set of common character strings.

At block 330, processing logic may assign integer ID values to one or more of the remaining unique generated character strings in the set of unique generated character strings. In an implementation, the one or more remaining unique generated character strings are treated as seed character strings within the integer edit distance space, and the integer ID values for the one or more remaining unique generated character strings are spaced apart such that the integer edit distance values between the remaining unique generated character strings are beyond an edit distance value threshold to match other character strings that have been already assigned integer ID values. For example, the remaining unique generated character strings within the set of unique generated character strings may include (importance, bright, importantly). Processing logic may select "importance" and "bright" and assign integer ID values of 21154 and 25002 respectively.

At decision block 335, processing logic determines whether there are remaining unique generated character strings within the set of unique generated character strings that have not yet been assigned integer ID values. If there are remaining unique generated character strings in the set of unique generated character strings that need integer ID value assignment, then processing logic proceeds to block 320 to assign integer ID values to the remaining unique generated character strings using clustering techniques of determining which unique generated character strings are within a threshold of an integer edit value that represents a generated character string that is sufficiently close to character string that has been assigned an integer ID value. For example, the unique generated character string "importantly" may be assigned the integer ID value of 21151 because "importantly" may be transformed to the character string "importance" (integer ID 21154) using three edit instructions. Processing logic may iteratively repeat blocks 320 through 335 until all remaining unique generated character strings are assigned an integer ID value.

If at decision block 335, processing logic determines that the unique generated character strings have been assigned integer ID values, then processing logic proceeds to block 340. At block 340, processing logic assigns integer ID values to the character strings in the set of common character strings. The set of common character strings comprise character strings that have been identified as being in both the sequence of caption character strings and the sequence of generated character strings. In an implementation, processing logic may assign integer ID values to at least a subset of character strings in the set of common character strings using clustering techniques described in block 320. If there are remaining common character strings that need to be assigned integer ID values, then processing logic may select one or more remaining common character strings and treat the selected common character strings as seed character strings by assigning integer ID values that are sufficiently spaced apart from the already assigned character strings. Processing logic may then iteratively assign integer ID values to remaining common character strings using clustering and seed assignment techniques similar to the techniques described in blocks 320 and 330 respectively.

In an implementation, each of the character strings in the plurality of caption character strings and the plurality of generated character strings are assigned integer ID values. FIG. 5A is an illustrative example of the integer ID value assignments for the plurality of caption character strings and the plurality of generated character strings. Table 505 illustrates the plurality of caption character strings, the plurality of generated character strings, the set of unique caption character strings, the set of unique generated character strings, and the set of common character strings. Table 505 illustrates the integer ID value assignments for each unique character string within the plurality of caption character strings and the plurality of generated character strings. Column 515 displays the integer ID value assigned to each character string, column 520 displays each unique character string from the plurality of caption character strings and the plurality of generated character strings, and column 525 displays the assignment method used to assign the integer ID values to each of the character strings.

Figure 3B:
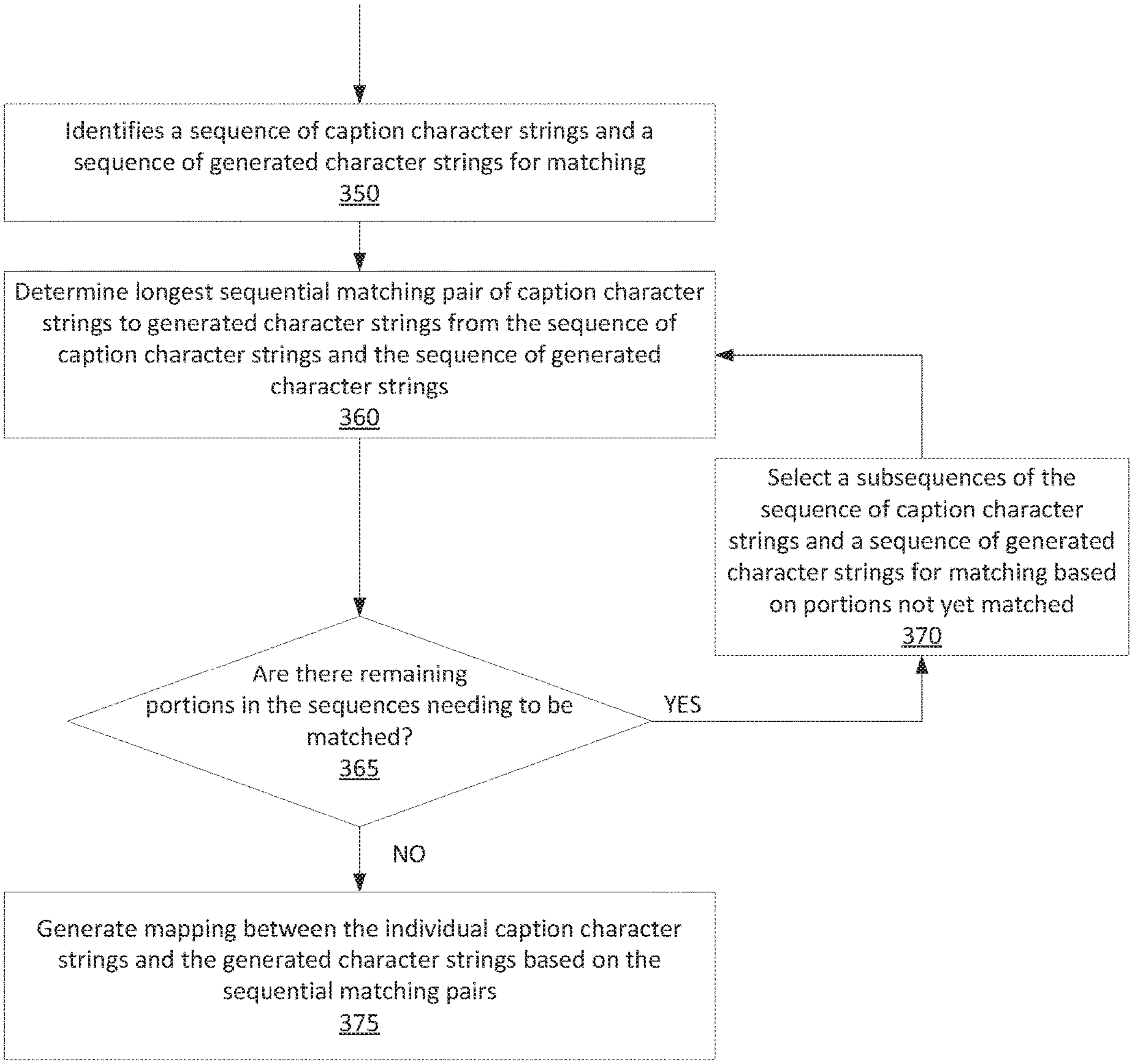
FIG. 3B illustrates an example method for determining matching sequences of caption character strings and generated character strings using assigned values, according to some aspects of the disclosure.

FIG. 3B illustrates a process for determining matching sequences of caption character strings and generated character strings using the assigned integer ID values. At block 350, processing logic identifies a sequence of caption character strings and a sequence of generated character strings for matching. In an implementation, processing logic uses the plurality of caption character strings in the order identified in the original caption data. For instance, the sequence of caption character strings represents the order of character strings as how they have been spoken within the video content item. Processing logic uses the plurality of generated character strings in the order identified in the speech recognition data.

At block 360, processing logic determines a longest sequential matching pair from the sequence of caption character strings and the sequence of generated character strings. In an implementation, an integer subsequence matching algorithm aligns both exact character strings and close matching character strings using the integer ID values associated with the character strings in the sequence of caption character strings and the sequence of generated character strings. Close matching character strings may be based upon an edit distance value threshold. The integer subsequence matching algorithm may allow for a certain number of mismatches within the sequential matching pair if it results in a longer sequential matching pair. FIG. 5B illustrates sequential matching pairs generated from the sequence of caption character strings and the sequence of generated character strings. Matching pair 530 may be determined by processing logic at block 360 as it is the longest identified sequential matching pair.

In an implementation, processing logic may allow mismatches and variations between the sequence of caption character strings and the sequence of generated character strings. For example, mismatch 532 illustrates a mismatch between "of/and" and mismatch 534 illustrates a mismatch between "to/on". These mismatches may be due to errors in the sequence of caption character strings or generated character strings based on typos or incorrectly recognized words. Processing logic may be configured to allow for mismatches on short character strings as edit distance value thresholds may not apply when mutation of a maximum number of characters has occurred. For instance, the edit distance value thresholds may not apply if transformation instructions on the original character string transform more than 40% of the original character string, as this may result in fairly different character strings to match unnecessarily.

At decision diamond 365, processing logic determines whether there are remaining portions of the sequence of caption character strings and the sequence of generated character strings that still need to be matched. Using the previous example, only a first portion of the sequence of caption character strings and the sequence of generated character strings is matched; therefore processing logic may be configured to iteratively match the remaining sequential portions. Processing logic proceeds to block 370 to select subsequences of the sequence of caption character strings and the sequence of generated character strings for matching. If however at decision diamond 365, processing logic determines that all portions of the sequence of caption character strings and the sequence of generated character strings have been matched then processing logic proceeds to block 375 to generate mapping between the individual caption character strings in the sequence of caption character strings and the individual generated character strings in the sequence of caption character strings.

At block 370, processing logic selects subsequences from the sequence of caption character strings and the sequence of generated character strings for matching. Processing logic proceeds to block 360 to determine the longest sequential match pair from the selected sequences. Blocks 360-370 are repeated until all sequential matching pairs have been determined.

In an implementation, processing logic may partially match sequences of the sequence of caption character strings and the sequence of generated character strings even if the partially matched sequences contain character strings that do not match. The matching portion of the partially matched sequences may be used as anchor points for determining areas that may match even though character strings were not matched using integer ID values. Subsequences in the partially matched sequences may be matched using other techniques.

In an implementation, if a subsequence of character strings only includes generated character strings, then processing logic may ignore the generated character strings as the caption character strings are used for determining the spoken dialogue. In another implementation, if the subsequence of caption character strings and the generated character strings has a one-to-one correspondence between the number of character strings, then processing logic may assume that the corresponding character strings match. For example, mismatch 552 illustrates caption character strings "come on" and generated character strings "c mon". These corresponding character strings may be paired together as a match of "come/c" and "on/mon".

In an implementation processing logic may compute a character string similarity matrix to determine matches for non-matching subsequences. For example, mismatch 565 contains caption character strings “served with chutney” and generated character strings “so with the chuck knee”. Processing logic may determine an exact match for the character string “with” between two subsequences. Processing logic may iteratively determine matching for the subsequences generated from matching “with” that include “served/so” and “chutney/the chuck knee”. Processing logic may determine a match from the subsequences “served/so” since it is a one-to-one correspondence. For the remaining subsequences, processing logic determines similarities between “chutney” and “chuck” based upon the three characters “chu” that are matching. Similarly, “knees” and “chutneys” contains a phonetic matching pair. Processing logic may ignore “the” from the generated character string subsequence since there is no corresponding pair in the caption character string subsequence.

At block 375, processing logic may generate mapping between the individual caption character strings and the generated character strings using the matched sequential pairs.

Figure 4A:
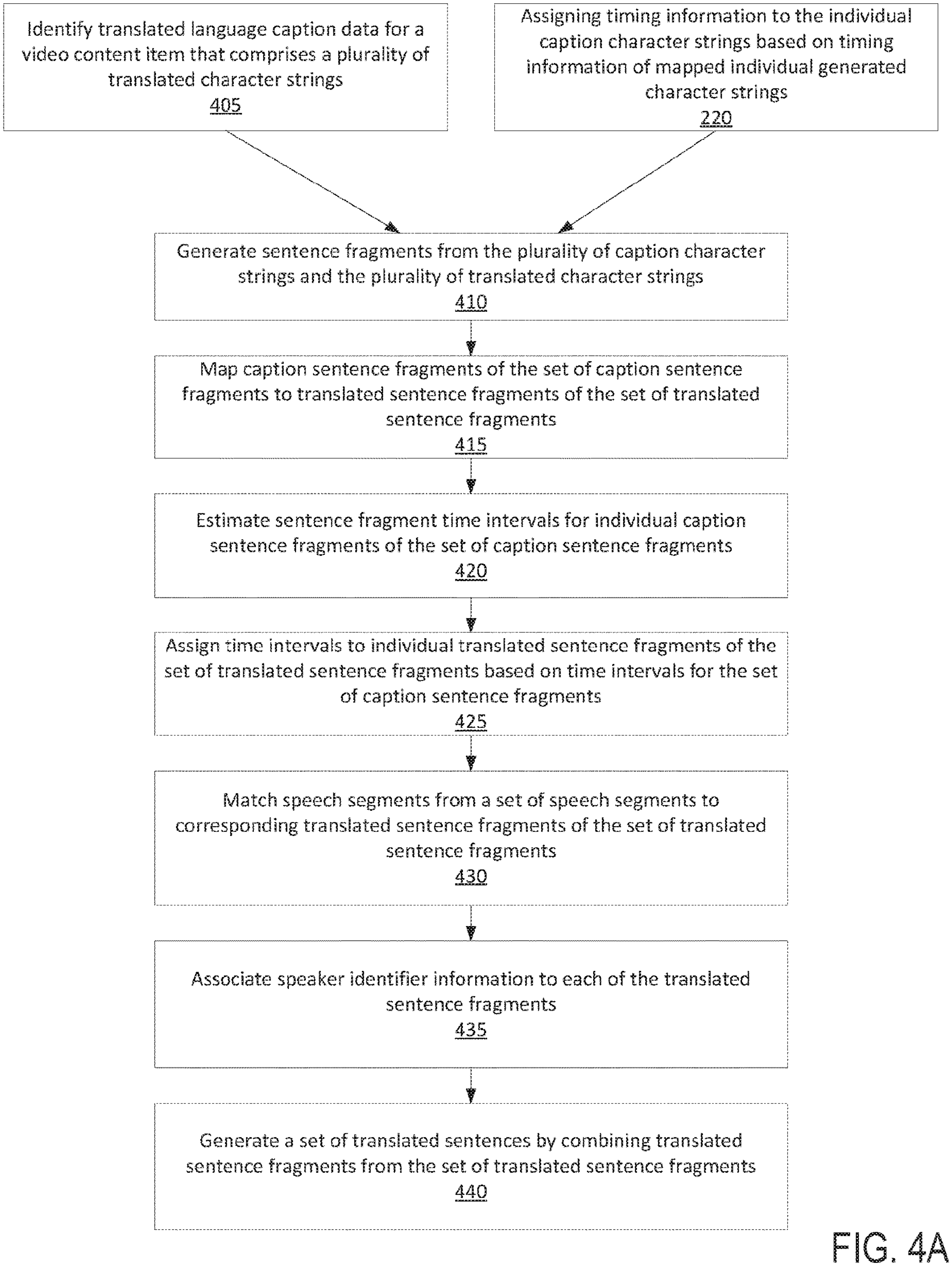
FIG. 4A illustrates an example method for aligning translated language caption data with an audio portion of a video content item using assigned timing information of individual caption character strings, according to some aspects of the disclosure.

FIG. 4A illustrates an example method for aligning translated language caption data with the audio portion of the video content item using the assigned timing information of individual caption character strings of the original caption data. In an implementation, blocks 405-430 represents detailed acts that may be performed within block 225 of FIG. 2.

At block 405, processing logic identifies translated language caption data for the video content item. The translated caption data may comprise a plurality of translated character strings associated with the audio portion of the video content item. Processing logic may be configured to normalize the translated character strings in the translation language caption data in order to remove non-spoken text or special characters from the translated character strings. Normalization may include identifying sentence breaks and other punctuation in the translated character strings and replace the translated punctuation with the standardized punctuation used by the processing logic, such as English.

At block 410, processing logic generates a set of caption sentence fragments from the plurality of caption character strings of the original caption data and a set of translated sentence fragments from the set of translated character strings. In an implementation, processing logic may identify sentence fragments using punctuation as sentence fragment boundary markers in the plurality of caption character strings and the plurality of translated character strings. For example, commas and sentence periods may be used as boundary markers for identifying sentence fragments within the plurality of caption character strings and the plurality of translated character strings. Processing logic may generate a set of caption sentence fragments containing identified sentence fragments of the caption character strings and a set of translated sentence fragments containing identified sentence fragments of the translated character strings.

At block 415, processing logic maps caption sentence fragments of the set of caption sentence fragments to translated sentence fragments of the set of translated sentence fragments. In an implementation, processing logic may pair sentence fragments from the set of caption sentence fragments and the set of translated sentence fragments using overlapping timing information. Sentence fragments in the set of caption sentence fragments may use caption timing from original caption data for pairing the sentence fragments to corresponding translated sentence fragments. Timing information from translated language caption data may be used to identify overlapping pairs of translated sentence fragments and caption sentence fragments.

At block 420, processing logic may estimate caption sentence fragment time intervals for the set of caption sentence fragments. In an implementation, processing logic may use timing information for individual caption character strings (assigned at block 220) to estimate the sentence fragment time intervals for the set of caption sentence fragments. For example, processing logic may assign a start time for a sentence fragment as the time associated with the a first character string in the sentence fragment. The end time for the sentence fragment may be assigned the time associated with the last character string in the sentence fragment.

In some cases, timing information for individual caption character strings may not be accurate due to timing errors that may be associated with generated character strings or due to mismatches that may occur when mapping caption character strings to generated character strings. In an implementation, processing logic may generate summary statistics for different character string lengths by aggregating timing information by character string length to compute median character string duration for each character string length. For example, summary statistics are aggregated for character strings that are five characters in length. The computed median duration for five-character character strings may then be used to estimate timing information for character strings that were matched at a lower confidence level. Median duration times are computed for each of the character string lengths in the plurality of caption character strings.

Processing logic may use assigned caption character string timing information and estimated character string timing information, based on median duration values, to estimate the start and end time of each sentence fragment based upon confidence values for each character string. If a sentence fragment contains caption character strings that were matched with high confidence values, then processing logic may use the assigned timing information associated with the start time of the first caption character string in the sentence fragment and the end time of the last character string of the sentence fragment to compute the start and end time of the entire sentence fragment.

If a sentence fragment contains a set of caption character strings near the middle of the sentence fragment with high confidence values and another set of caption character strings in the beginning and the end of the sentence that have lower confidence values, then processing logic may use the set of caption character strings with the high confidence values as an anchor for determining timing information for the sentence fragment. For the duration of leading and trailing character strings, processing logic may use estimated timing information from the computed summary statistics. Processing logic may, subtract median duration timing values for each low confidence caption character string that precedes the anchored caption character string in the sentence fragment to determine the start time of the sentence fragment. For example, if the sentence fragment contains caption character strings “fried served with chutney” where confidence values are {fried=0.72, served=0.18, with=1.00, chutney=0.34}, then processing logic may identify the caption character string “with” as a high confidence caption character string and anchor the character string using the start and end time. The start and end time for “with” is [2:12.709, 2:12.979] respectively. Median times for the character strings “fried” and “served” are based on 5-character and 6-character string median times respectively. Processing logic may subtract the 5-character and 6-character string median times from the start time of the anchor word "with" in order to estimate the start time of the sentence fragment. The end time for the sentence fragment may similarly be calculated by adding median duration times corresponding to each of the trailing low confidence caption character strings until the end of the sentence fragment is reached. For example, the end time may be estimated by adding the median duration for the 7-character string "chutney" to the end time of the anchor caption character string "with".

If the sentence fragment does not contain any caption character strings with high confidence scores, processing logic may approximate the sentence fragment duration using summary statistics for each caption character string in the sentence fragment. In an implementation, processing logic aggregates the median duration values for each caption character string in the sentence fragment and then determines the mid-point of the sentence fragment using the estimated timing. After the mid-point is determined the start and end times may be estimated.

At block 425, processing logic assigns the estimated time intervals to individual translated sentence fragments of the set of translated sentence fragments based on estimated time intervals of mapped individual caption sentence fragments of the set of caption sentence fragments. In an implementation, processing logic assigns the estimated start/end timing from the set of caption sentence fragments to corresponding translated sentence fragments in the set of translated sentence fragments.

At block 430, processing logic matches a set of speech segments to the set of translated sentence fragments. Speech segments refer to intervals of time in which speech is active in the video content item and when only one speaker is speaking. For example, an individual speech segment may represent a duration of time in which one person is speaking. If within the video there are multiple people speaking back-to-back, the speech of each person is represented as a separate speech segment. Speech segments may be provided by the content sharing platform 120 or any other external or internal speech segmentation service platform configured to analyze audio and video portions of a video content item to provide speaker information and associated speech segments for caption data associated with the video content item. The set of speech segments may include timing information identifying the start/end times for each speech segment.

In an implementation, processing logic may request a set of speech segments for the video from the content sharing platform 120. Processing logic may compare timing information from the set of speech segments to the estimated timing information assigned to the set of translated sentence fragments. If timing from an individual speech segment overlaps the estimated timing information for a translated sentence fragment then processing logic may consider the individual speech segment and the corresponding translated sentence fragment as matching. Processing logic may adjust timing information of individual translated sentence fragments in the set of translated sentence fragments using the timing information from the matching speech segments.

In an implementation if timing information for a translated sentence fragment overlaps with multiple speech segments, then processing logic may merge the multiple speech segments into a single speech segment for the purposes of matching the translated sentence fragment to a corresponding speech segment. Matching a translated sentence fragment to multiple speech segments may occur if the speech segments are over-split by the speech segmentation service platform. For example, the speech segmentation service platform may include multiple speech segments that refer to consecutive speech by a single speaker that may have been over-split. During matching, processing logic may combine the over-split speech segments into a single speech segment that matches to a single translated sentence fragment.

In an implementation if a translated sentence fragment sufficiently overlaps with a speech segment and slightly overlaps with another speech segment, then processing logic may be configured to ignore the slightly matching speech segment and match the translated sentence fragment to the speech segment that sufficiently overlaps the translated sentence fragment. Sufficient overlap may be defined as a percentage of timing overlap that exceeds a configured threshold. For example, if 80% of a translated sentence fragment overlaps with a speech segment then the translated sentence fragment and the speech segment may be considered as sufficiently overlapping. In other implementations, sufficient overlap may be based on a minimum amount of time or any other measureable metric.

In an implementation if a translated sentence fragment does not sufficiently overlap with a particular speech segment, processing logic may match the translated sentence fragment to a speech segment based on the speech segment that is closest based on timing information.

Upon matching translated sentence fragments to corresponding speech segments, processing logic may adjust timing information of individual translated sentence fragments in the set of translated sentence fragments using the timing information from the matching speech segments. For each speech segment, matched translated sentence fragments may be proportionally time-adjusted to match the timing information of the matched speech segment. For example, if two translated sentence fragments match a single speech segment and the first translated sentence fragment is twice the duration of the second translated sentence fragment, then processing logic may adjust the start time of the first translated sentence fragment to align with the start time of the speech segment and adjust the end time of the first translated sentence fragment to end at approximately ⅔rds through the duration of the speech segment. Processing logic may adjust the start time of the second translated sentence fragment to approximately ⅔rds through the duration of the speech segment and adjust the end time of the second translated sentence fragment to the end time of the speech segment.

At block 435, processing logic may associate speaker information to each of the translated sentence fragments in the set of translated sentence fragments using speaker identifier (ID) information from the speech segments. In an implementation, provided speech segments may include metadata information that includes speaker ID information associated with each speech segment. For example, the speaker ID information may indicate which person within the video content item spoke the dialogue within the speech segment. Speaker ID information may include demographic information related to the speaker's gender, age, screen position, or any other relevant information related to the speaker's identity. For example, the provided speech segments from the content sharing platform 120 may use technologies such as face tracking, visual speech classification (i.e., looking at each face in the video over time to automatically infer whether it is speaking), and audio voice identification to determine speaker ID information for each speaker in the video. In an implementation, processing logic may assign unique synthetic voices to each of the speaker IDs based upon the speaker ID information.

At block 440, processing logic may combine consecutive translated sentence fragments from the set of translated sentence fragments to generate a set of translated sentences. In an implementation, processing logic may combine consecutive translated sentence fragments using associated speaker IDs, punctuation, and timing information of consecutive translated sentence fragments. For example, if consecutive translated sentence fragments have the same associated speaker ID, then processing logic may combine the consecutive translated sentence fragments to generate a translated sentence. In another example, if consecutive translated sentence fragments are identified as partial sentences, then processing logic may combine the partial sentences to generate a translated sentence based on the punctuation in the translated sentence fragments. In yet another example, if consecutive translated sentence fragments are close in time with short or no gaps between the end time of one translated sentence fragment and the start time of another translated sentence fragment, then processing logic may combine the consecutive translated sentence fragments to generate a single translated sentence. Processing logic generates set of translated sentences that includes the timing information and speaker ID information from the translated sentence fragments. In an implementation, processing logic may align the set of translated sentences to the audio portion of the video.

Figure 4B:
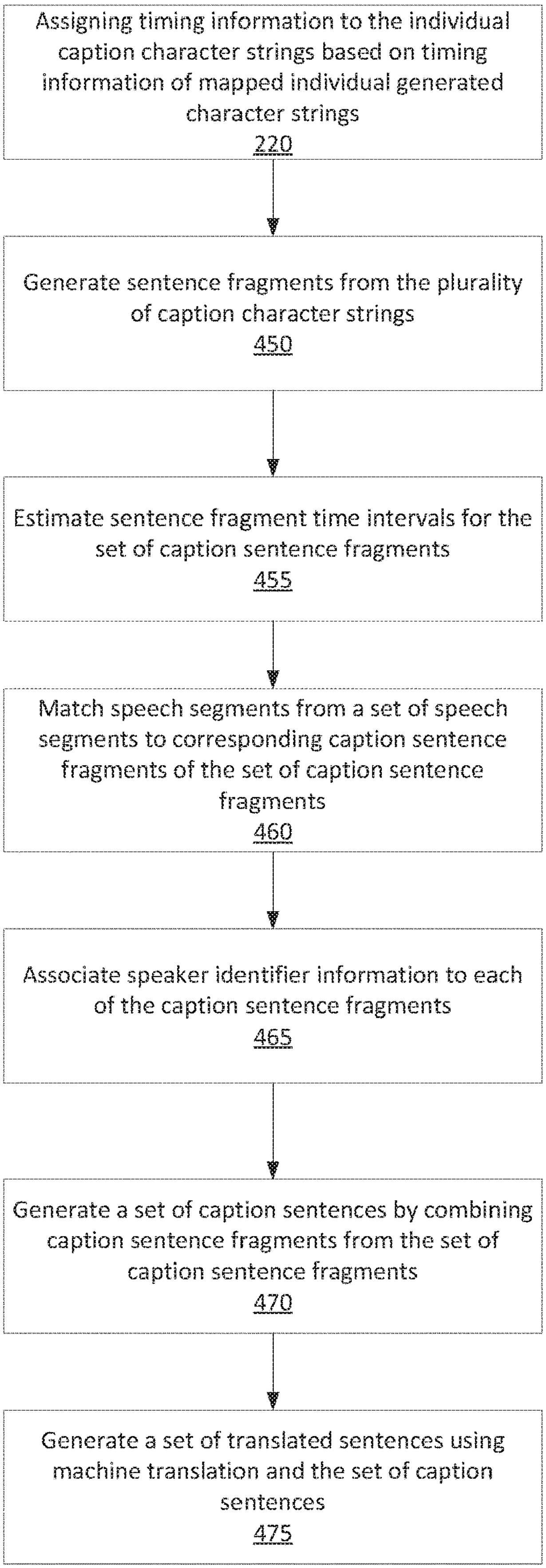
FIG. 4B illustrates an example method for aligning machine generated translation caption data with an audio portion of a video using assigned timing information of individual caption character strings, according to some aspects of the disclosure.

FIG. 4B illustrates an example method for aligning machine generated translation caption data with the audio portion of the video using the assigned timing information of individual caption character strings. In an implementation, blocks 450-475 represent detailed acts that may be performed within block 225 of FIG. 2.

At block 450, processing logic generates sentence fragments from the plurality of caption character strings. In an implementation, processing logic may identify sentence fragments using punctuation as sentence fragment boundary markers in the plurality of caption character strings. Processing logic may generate the set of caption sentence fragments containing sentence fragments of the caption character strings.

At block 455, processing logic estimates sentence fragment time intervals for the set of caption sentence fragments. In an implementation, processing logic may use assigned timing information for the individual caption character strings to estimate the sentence fragment time intervals for the set of caption sentence fragments using summary statistics as described in block 415.

At block 460, processing logic may match a set of speech segments, provided by the content sharing platform 120 or any other external or internal speech segmentation service platform to the set of caption sentence fragments. In an implementation, processing logic may request a set of speech segments for the video from the content sharing platform 120. Processing logic may compare timing information from the set of speech segments to the estimated timing information assigned to the set of caption sentence fragments. If timing from an individual speech segment overlaps the estimated timing information for a caption sentence fragment then processing logic may consider the individual speech segment and the corresponding caption sentence fragment as matching. Processing logic may adjust timing information of individual caption sentence fragments in the set of caption sentence fragments using the timing information from the matching speech segments.

In an implementation if timing information for a caption sentence fragment overlaps with multiple speech segments, then processing logic may merge the multiple speech segments into a single speech segment for the purposes of matching the caption sentence fragment to a corresponding speech segment. Matching a caption sentence fragment to multiple speech segments may occur if the speech segments are over-split by the speech segmentation service platform. For example, the speech segmentation service platform may include multiple speech segments that refer to consecutive speech by a single speaker that may have been over-split. During matching, processing logic may combine the over-split speech segments into a single speech segment that matches to a single caption sentence fragment.

In an implementation if a caption sentence fragment sufficiently overlaps with a speech segment and slightly overlaps with another speech segment, then processing logic may be configured to ignore the slightly matching speech segment and match the caption sentence fragment to the speech segment that sufficiently overlaps the caption sentence fragment. In an implementation if a caption sentence fragment does not sufficiently overlap with a particular speech segment, processing logic may match the caption sentence fragment to a speech segment based on the speech segment that is closest based on timing information.

Upon matching caption sentence fragments to corresponding speech segments, processing logic may adjust timing information of individual caption sentence fragments in the set of caption sentence fragments using the timing information from the matching speech segments. For each speech segment, matched caption sentence fragments may be proportionally time-adjusted to match the timing information of the matched speech segment. For example, if two caption sentence fragments match a single speech segment and the first caption sentence fragment is twice the duration of the second caption sentence fragment, then processing logic may adjust the start time of the first caption sentence fragment to align with the start time of the speech segment and adjust the end time of the first caption sentence fragment to end at approximately ⅔rds through the duration of the speech segment. Processing logic may adjust the start time of the second caption sentence fragment to approximately ⅔rds through the duration of the speech segment and adjust the end time of the second caption sentence fragment to the end time of the speech segment.

At block 465, processing logic may associate speaker information to each of the caption sentence fragments in the set of caption sentence fragments using speaker ID information from the speech segments. As discussed previously, the provided speech segments may include metadata information that includes speaker ID information associated with each speech segment. Speaker ID information may include demographic information related to the speaker's gender, age, screen position, or any other relevant information related to the speaker's identity.

At block 470, processing logic may combine consecutive caption sentence fragments from the set of caption sentence fragments to generate a set of caption sentences. In an implementation, processing logic may combine consecutive caption sentence fragments using associated speaker IDs, punctuation, and timing information of consecutive caption sentence fragments. For example, if consecutive caption sentence fragments have the same associated speaker ID, then processing logic may combine the consecutive caption sentence fragments to generate a caption sentence. In another example, if consecutive caption sentence fragments are identified as partial sentences, then processing logic may combine the partial sentences to generate a caption sentence based on the punctuation in the caption sentence fragments. In yet another example, if consecutive caption sentence fragments are close in time with short or no gaps between the end time of one caption sentence fragment and the start time of another caption sentence fragment, then processing logic may combine the consecutive caption sentence fragments to generate a single caption sentence. Processing logic generates set of caption sentences that includes the timing information and speaker ID information from the caption sentence fragments.

At block 475, processing logic generates a set of translated sentences using machine translation and the set of caption sentences. In an implementation, processing logic may send a request to the speech recognition and generation service 150 to generate a set of translated sentences from the set of caption sentences. The generated machine translations may be represented as a set of translated sentences and processing logic may associate timing information and speaker ID information to each individual translated sentence from the corresponding caption sentences. In an implementation, processing logic may align the set of translated sentences to the audio portion of the video.

Figure 6A:
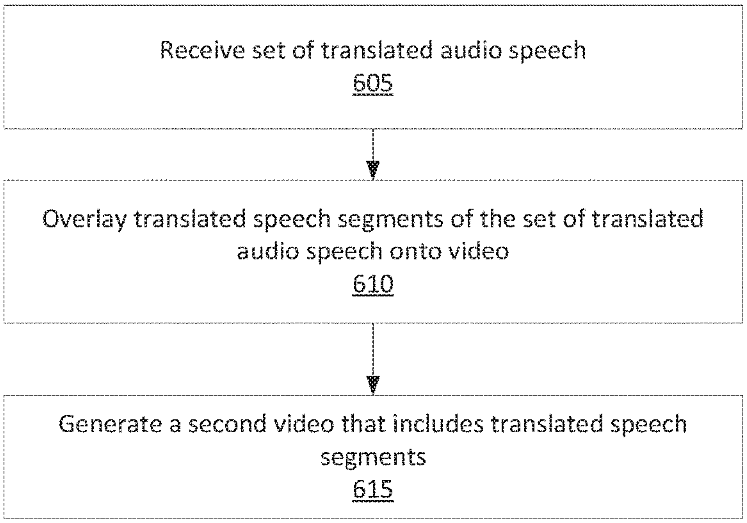
FIG. 6A illustrates an example method for overlaying translated audio speech onto video and generating a second video that includes translated audio portions of speech, according to some aspects of the disclosure.

In an implementation, processing logic may transform the set of translated sentences into translated audio speech that may be overlaid onto the video to create a translated version of the original video content item. The translated audio speech may be generated using an automated speech synthesizer that is configured to synthesize the translated sentences into the translated audio speech. In other examples, translated audio speech may be generated using a translated voice performance from a voice actor. The use of a voice actor to generate translated audio speech may be beneficial if higher quality voices and/or emotive speech produces more desirable translated audio speech for overlaying. FIG. 6A illustrates an example method for overlaying translated audio speech onto the video and generating a second video that includes translated audio portions of speech. The example method may describe using either translated audio speech from a voice synthesizer, translated audio speech produced by voice actors, or a combination of both. At block 605, processing logic may receive a set of translated audio speech, where each translated audio speech in the set of translated audio speech corresponds to the translated sentences in the set of translated sentences.

In an implementation, processing logic may request, from the speech recognition and generation service 150 or any other translation and speech generation service, audio speech corresponding to the set of translated sentences. The audio speech, referred to as translated audio speech, may be received as a set of translated audio speech segments, where each translated audio speech segment corresponds to a translated sentence from the set of translated sentences. In an implementation, each audio speech segment in the set of audio speech segments may include machine generated audio speech that matches the corresponding speaker ID properties for each translated sentence. For example, if a translated sentence has a speaker ID and associated speaker properties that indicate that the speaker is a woman, then the corresponding audio speech segment received may be machine generated audio speech that matches a female voice.

In an implementation, the speech recognition and generation service 150 may be configured to select synthetic voices for speakers based on the associated speaker ID information. The speech recognition and generation service 150 may sort the different speakers based on the duration of time each speaker speaks and then assign matching synthetic voices to the speakers with the most speaking time first. After assigning synthetic voices for the speakers with the most speaking time, the remaining speakers may be assigned synthetic voices based upon the associated speaker ID information and the remaining available synthetic voices.

At block 610, processing logic may, for each translated audio speech in the set of translated audio speech, overlay the translated audio speech onto the video using the timing information associated with the corresponding translated sentence and the duration information associated with the translated audio speech. If the duration of the translated audio speech and the duration of the corresponding translated sentence match, then the translated audio speech may be seamlessly overlaid onto video replacing the original audio portion for the corresponding translated sentence. For example, if the corresponding translated sentence is "I like chickpea soup" and the timing information for the translated sentence indicates that the translated sentence is 2.2 seconds long, then the translated audio speech for "I like chickpea soup" may be seamlessly overlaid onto the video if the translated audio speech is also 2.2 seconds long.

If the translated audio speech is either longer or shorter in duration, then overlaying the translated audio speech without modification may end up looking unpleasant. For instance, if the translated audio speech is shorter than the duration of the translated sentence, then the audio speech would end but the video would show the speaker's lips still moving. Conversely, if the translated audio speech is longer than the duration of the translated sentence, then the audio speech would still be playing after the speakers lips have stopped moving. In both situations, a viewer of the translated video may be discouraged from watching the video due to the incorrectly dubbed translated audio speech.

In an implementation, processing logic may lower the audio volume of the original audio portion corresponding to the original audio speech and overlay the translated audio speech. In another implementation, processing logic may digitally erase the voice from the original audio portion, while retaining other sounds such as music or background noises, and overlay the corresponding translated audio speech. In yet another implementation, processing logic may replace the original audio portion with the translated audio speech.

Figure 6B:
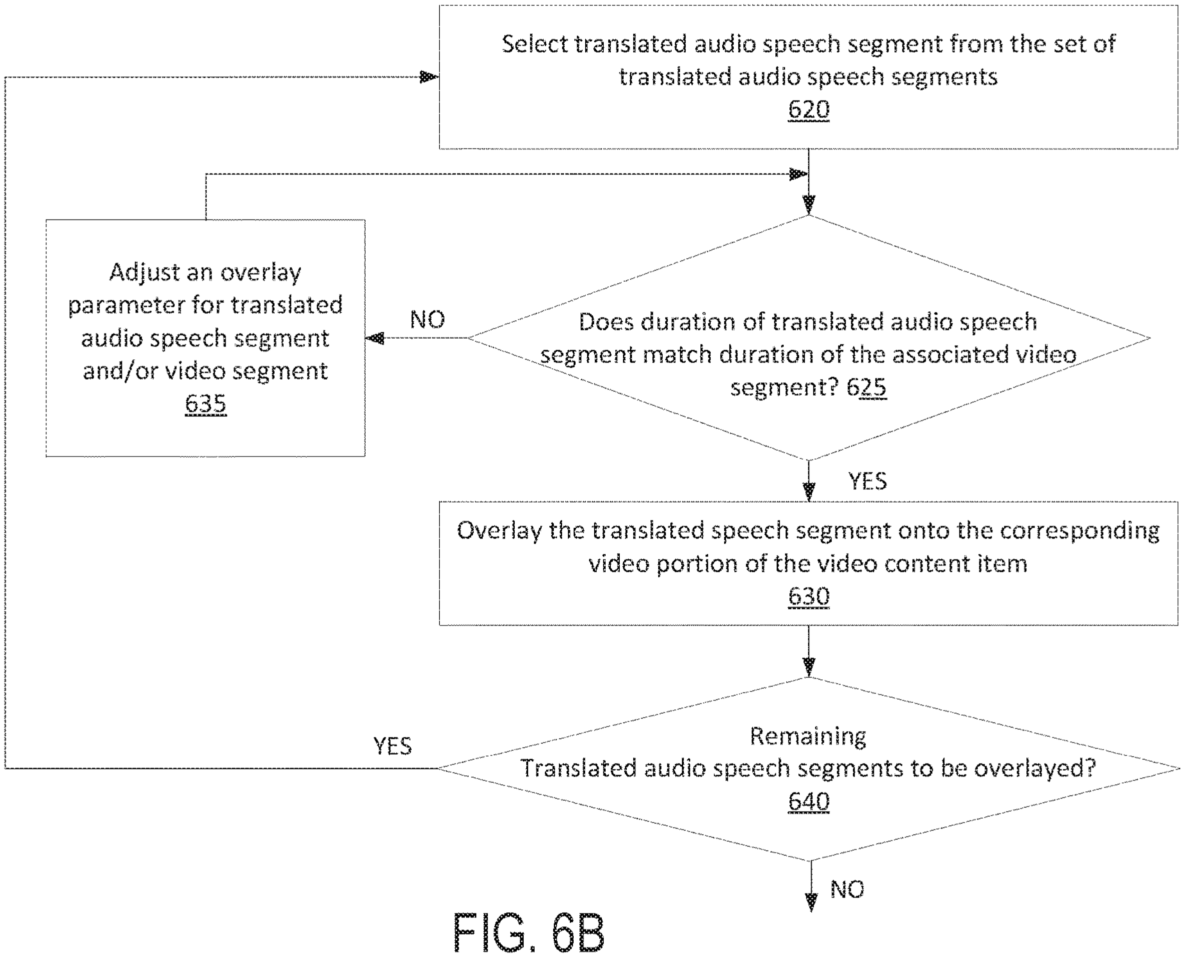
FIG. 6B illustrates an example method for adjusting overlay parameters to match audio and video durations in a video content item with translated speech, according to some aspects of the disclosure.

FIG. 6B illustrates an example method for adjusting overlay parameters to match audio and video durations in a video content item with translated speech. At block 620, processing logic selects a translated audio speech in the set of translated audio speech for overlaying onto the video. At decision block 625, processing logic determines whether the duration of the selected translated audio speech matches the duration of the associated video segment. If the duration of the translated audio speech and the duration of the associated video segment match, then no adjustment to the audio or video is needed for overlaying the translated audio speech, and processing logic may proceed to block 630 to perform the overlay. If the duration of the translated audio speech and the duration of the associated video segment do not match, then the audio and/or video of the translated audio speech and/or the video may be adjusted in order to generate a seamless overlay of the translated audio speech and the video.

At block 635, processing logic may adjust overlay parameters in order to match the duration of the translated speech segment to the corresponding video segment in the video. Overlay parameters may include adjusting the audio rate of the translated audio speech and the video rate and/or duration for the segment of video corresponding to the translated audio speech.

In an implementation, processing logic may adjust the translated audio speech rate, either faster or slower, in order to make the translated audio speech match the duration of the original audio speech in the video. For example, if the translated audio speech is 2.5 second long and the original audio speech is 2.2 seconds long, then processing logic may speed up the rate of the translated audio speech by about 10% in order to adjust the duration of the translated audio speech to be 2.2 seconds long. In another example, if the translated audio speech is 1.95 second long and the original audio speech is 2.2 seconds long, then processing logic may slow down the rate of the translated audio speech by about 10% in order to adjust the duration of the translated audio speech to be 2.2 seconds long.

Adjustment of the audio speech rate of the translated audio speech is preferable if the adjustment parameters are within a desired speed adjustment range. If the rate of the translated audio speech is sped up too much, then the translated speech segment may be played too fast to be understandable by a viewer. If the rate of the translated audio speech is slowed down too much, then the translated speech segment may be played too slow, and the translated audio speech may sound distorted or slurred. Processing logic may implement a configured minimum and maximum playback speed threshold, where the minimum speed threshold is the slowest rate at which the translated audio speech may be played without negative effects and the maximum speed threshold is the fastest rate at which the translated audio speech may be played without negative effects experienced by a viewer. In an implementation, the configured minimum and maximum playback speed threshold may be language specific. Language specific configured min/max playback speed thresholds may be based on how understandable each specific language is after speech adjustments. For example, the English min/max playback speed threshold may allow for greater speed adjustment than the Chinese min/max playback speed threshold.

In an implementation, processing logic may determine multiple translated audio speeches that occur close in time for the purpose of reducing the amount of translated audio speed rate slowdown. Short pauses may be identified between the multiple translated audio speeches. Processing logic may adjust and overlay the multiple translated audio speeches as a group by adjusting the start time of subsequent translated audio speeches within the group in order to add extra pauses between the multiple translated audio speeches. Adding extra pauses between the multiple translated audio speeches allows processing logic to extend the duration of the multiple translated audio speeches without having to significantly slow down the speed rate of each of the multiple translated audio speeches.

In an implementation, processing logic, at block 635, may adjust the translated audio speed rate of the translated audio speech within the configured minimum and maximum playback speed thresholds. Processing logic may proceed back to decision block 630. If at decision block 630, processing logic determines that the translated audio speech matches the duration of the original audio speech in the video, then processing logic may proceed to block 630 to overlay the translated audio speech onto the corresponding video portion of the video. If after adjusting the translated audio speed rate, within the configured minimum and maximum playback speed thresholds, the duration of the translated audio speech does not match the duration of the original audio speech in the video, processing logic may proceed back to block 635 for further adjustment of overlay parameters. Processing logic may adjust the video rate of the corresponding video portion from the video in order to make the durations of the translated audio speech match the adjusted duration of the video portion corresponding to the original audio speech.

In an implementation, processing logic may adjust the video rate for the corresponding video portion corresponding to the original audio speech by adjusting the video portion playback rate, either faster or slower, in order to make the translated audio speech duration match the duration of the corresponding video portion. Processing logic may implement a configured min/max video rate adjustment threshold, where the minimum adjustment threshold is the slowest rate at which the video portion may be played without negative effects and the maximum adjustment threshold is the fastest rate at which the video portion may be played without negative effects experienced by a viewer. The configured min/max video rate adjustment threshold may be a smaller adjustment window than the configured min/max playback speed threshold for adjust the audio rate because adjusts to the video may be more noticeable to the viewer than adjustments to the audio rate.

In an implementation, processing logic may adjust the video rate for the corresponding video portion corresponding by duplicating selected frames in the video portion. Duplicating selected frames may increase the playback duration of the video portion in order to match the duration of longer translated audio speech. Selected frames may be duplicated at regular intervals in order to stretch the duration of the video portion.

In an implementation, processing logic may remove selected video frames in the video portion in order to compress the duration of the video portion to match shorter translated audio speech. For example, processing logic may remove selected frames at regular intervals of the over the duration of the video portion in order to make the video portion play more quickly.

In an implementation, adjustment of the video rate by duplicating or removing selected frames may be based on a min/max video adjustment threshold that specifies the number of frames that may be added or removed during the regular intervals. The min/max video adjustment threshold may be configured based on the type of video within the video portion. For example, if the video portion includes static frames, such as a display of a slideshow, then the min/max video adjustment threshold may allow for increased removal or duplication of video frames because the viewer is less likely to notice the adjustments to the video portion. If the video portion includes fast moving scenes, such as an action sequence, then the min/max video adjustment threshold may allow a limited number of changes to the video frames because adjustments to fast moving video is more easily noticeable by the viewer.

In an implementation, processing logic may adjust the audio of a translated audio speech, the video portion that corresponds to original audio speech, or a combination of both audio and video adjustments.

Referring to block 635, processing logic may adjust an overlay parameter, such as the audio rate of the translated audio speech or the video rate of the corresponding video portion. Upon adjusting the overlay parameter, processing logic proceeds to decision block 625 to determine whether additional adjustments are necessary to match the durations of the translated audio speech and the original audio speech. If additional adjustments are necessary, then processing logic proceeds back to block 635 for additional adjustments to either the audio rate of the translated audio speech or the video rate of the corresponding video portion. If no additional adjustments are necessary, then processing logic proceeds to block 630 to overlay the translated audio speech onto the corresponding video portion of the video.

At block 630, processing logic may overlay the translated audio speech onto the corresponding video portion of the video to generate a translated audio track for the viewer. In an implementation, processing logic may keep non-speaking audio portions of the original audio portion when generating the translated audio track. This allows for the viewer to still hear audio related to other non-speaking sounds in order to preserve the overall video experience. However, if the audio switches between translated audio speeches and original audio, the viewer may experience abrupt changes in audio sound, which may be undesirable.

In an implementation, processing logic may reduce the effects of abrupt changes in audio by inserting silence between two translated audio speeches when there is a short gap between the two translated audio speeches. For example, if there is ½ second gap between the two translated audio speeches then it may be undesirable to play a ½ second of the original audio portion. Instead processing logic may insert silence between the two translated audio speeches as the gap between the two is small.

In an implementation, processing logic may add a short period of silence immediately before and after a translated audio speech if the original audio includes continuous sound to sound that immediately before or after the translated audio speech. For example, if the original audio includes continuous sounds of traffic noises, then it may be jarring to hear a translated audio speech that ends and then continuous sounds of traffic noises immediately begins afterwards. Processing logic may add a buffer of silence before and after in order to allow the viewer to comprehend the translated audio speech before introducing the original audio, such as continuous sounds of traffic noises.

In an implementation, processing logic may implement fade-in and fade-out techniques to transition between the original audio and the translated speech segment to prevent abrupt transitions. For example, processing logic may, before playing the translated audio speech, fade out the original audio in order to produce a smooth transition into the translated audio speech. Similarly, processing logic may, after playing the translated audio speech, fade in the original audio in order to produce a smooth transition from the translated audio speech and the original audio.

Upon overlaying the translated audio speech onto the corresponding video portion, processing logic proceeds to decision diamond 640. At decision diamond 640, processing logic determines whether additional translated audio speeches are to be overlaid onto the video. If additional translated audio speeches are to be overlaid on the video, processing logic proceeds to block 620 to select another translated audio speech. If all translated audio speeches have been overlaid onto the video, then processing logic proceeds to block 615 to generate a second video.

Referring to FIG. 6A, at block 615 processing logic generates a second video that includes the translated audio portions overlaid onto the audio track and the video portion of the original video. In an implementation if video rates have been adjusted, then processing logic may generate a separate second video that includes the adjusted video and the overlaid audio portion.

In an implementation, if audio rates were only adjusted during the overlay process, then processing logic may incorporate the overlaid audio portion as an additional audio track in the original video. If however, video rate have been adjusted using video speed rate adjustment, then processing logic may add additional metadata to the original video, along with a translated audio track referring to the overlaid portions in order to incorporate the translated audio into the original video. The additional metadata may specify when the media player needs to speed up or slow down the video rate, thereby including playback instructions for the client media player, such as the media viewer 111, to allow for the original video to incorporate the translated audio without having to generate a separate second video.

Figure 7:
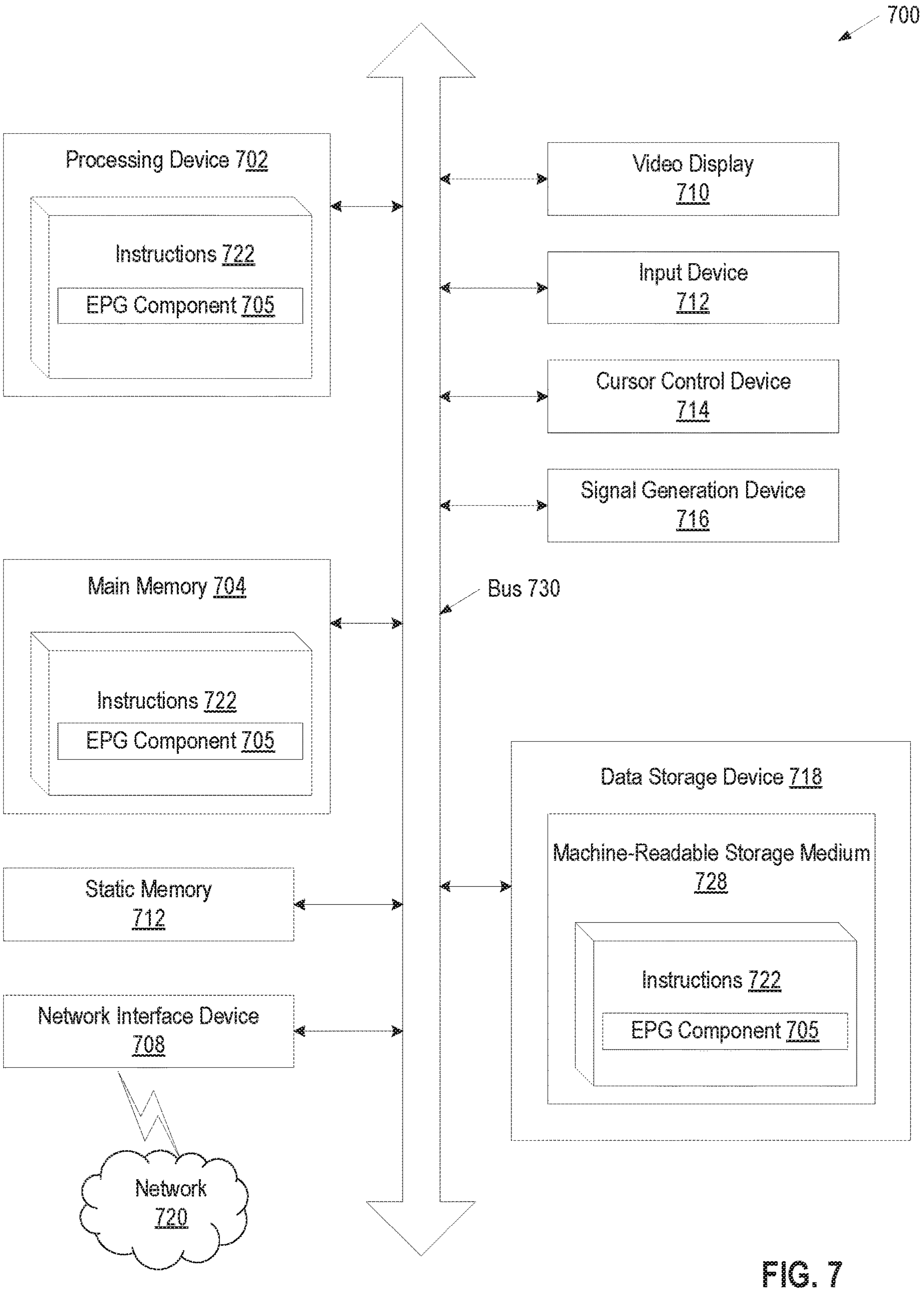
FIG. 7 depicts a block diagram of an example computing system operating in accordance with one or more aspects of the present disclosure.

FIG. 7 depicts a block diagram of an example computing system operating in accordance with one or more aspects of the present disclosure. In various illustrative examples, computer system 700 may correspond to any of the computing devices within system architecture 100 of FIG. 1. In one implementation, the computer system 700 may be each of the servers 130A-130Z. In another implementation, the computer system 700 may be each of the client devices 130A-130Z.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions implementing the cloud-based content management platform 125

(125A-125Z) and/or the user interface 134 (134A-134Z) of FIG. 1 for implementing the methods described herein.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method comprising:

identifying, by a processing device, original caption data for a video, wherein the original caption data comprises a plurality of caption character strings associated with an audio portion of the video;

identifying, by the processing device, speech recognition data generated for the audio portion of the video, the speech recognition data comprising a plurality of generated character strings and associated timing information for each generated character string;

mapping the plurality of caption character strings of the original caption data to the plurality of generated character strings of the speech recognition data using assigned values indicative of semantic similarities between individual caption character strings of the plurality of caption character strings of the original caption data and individual generated character strings of the plurality of generated character strings of the speech recognition data;

assigning timing information to the individual caption character strings of the original caption data based on timing information of mapped individual generated character strings of the speech recognition data; and aligning a translation of the original caption data with the audio portion of the video using the timing information assigned to the individual caption character strings of the original caption data based on the timing information of the mapped individual generated character strings of the speech recognition data.

2. The method of claim 1, further comprising prior to mapping the plurality of caption character strings to the plurality of generated character strings, normalizing the plurality of caption character strings and the plurality of generated character strings by removing non-spoken character strings.

3. The method of claim 1, wherein mapping the plurality of caption character strings to the plurality of generated character strings using the assigned values indicative of semantic similarities between the individual caption character strings of the plurality of caption character strings and the individual generated character strings of the plurality of generated character strings comprises:

assigning an integer identifier value to each unique character string of the individual caption character strings of the plurality of caption character strings and each unique character string of the individual generated character strings of the plurality of generated character strings; and wherein a distance between a first integer identifier value associated with a first character string and a second integer identifier value associated with a second character string represents character differences between the first character string and the second character string.

4. The method of claim 1, wherein mapping the plurality of caption character strings to the plurality of generated character strings using the assigned values comprises:

determining matching pairs of sequences of caption character strings in the plurality of caption character strings and sequences of generated character strings in the plurality of generated character strings using the assigned values of each individual caption character string of the plurality of caption character strings and each individual caption character string of the plurality of generated character strings; and mapping the individual caption character strings of the plurality of caption character strings to the individual generated character strings of the plurality of generated character strings based on the matching pairs of the sequences of caption character strings and the sequences of generated character strings.

5. The method of claim 1, wherein aligning the translation of the original caption data with the audio portion of the video using the assigned timing information of the individual caption character strings comprises:

identifying translated language caption data for the video, wherein the translated language caption data comprises a plurality of translated character strings associated with the audio portion of the video;

generating a set of caption sentence fragments from the plurality of caption character strings and a set of translated sentence fragments from the plurality of translated character strings using punctuation in the plurality of caption character strings and the plurality of translated character strings;

mapping caption sentence fragments of the set of caption sentence fragments to corresponding translated sentence fragments of the set of translated sentence fragments based on timing associated with the original caption data and the translated language caption data;

estimating time intervals for individual caption sentence fragments of the set of caption sentence fragments using the assigned timing information of the individual caption character strings;

assigning time intervals to individual translated sentence fragments of the set of translated sentence fragments based on estimated time intervals of mapped individual caption sentence fragments;

generating a set of translated sentences using consecutive translated sentence fragments of the set of translated sentence fragments based on punctuation; and aligning the set of translated sentences with the audio portion of the video using assigned time intervals of individual translated sentence fragments from corresponding translated sentences.

6. The method of claim 5, further comprising:

identifying speech segment data for the video, wherein the speech segment data comprises a plurality of speech segments with speech timing information associated with the audio portion of the video; and updating the time intervals for the individual translated sentence fragments based on speech timing information associated with the plurality of speech segments.

7. The method of claim 1, wherein aligning the translation of the original caption data with the audio portion of the video using the assigned timing information of the individual caption character strings comprises:

generating a set of caption sentence fragments from the plurality of caption character strings using punctuation in the plurality of caption character strings;

estimating time intervals for individual caption sentence fragments of the set of caption sentence fragments using the assigned timing information of the individual caption character strings;

generating a set of caption sentences using consecutive caption sentence fragments of the set of caption sentence fragments based on punctuation;

generating a set of translated sentences based on the set of caption sentences using machine translation and assigning timing information to each of the translated sentences based on estimated time intervals of corresponding caption sentences; and aligning the set of translated sentences with the audio portion of the video using the assigned timing information.

8. The method of claim 7, further comprising:

identifying speech segment data for the video, wherein the speech segment data comprises a plurality of speech segments with speech timing information associated with the audio portion of the video; and updating the time intervals for the individual caption sentence fragments of the set of caption sentence fragments based on speech timing information associated with the plurality of speech segments.

9. The method of claim 1, further comprising:

obtaining translated audio speech that is machine-generated speech for the translation of the original caption data, wherein the translated audio speech comprises a set of translated audio speech segments;

overlaying translated audio speech segments of the set of translated audio speech segments onto video segments of the video that correspond to time intervals for each of the translated audio speech segments; and generating a second video containing a video portion of the video and a translated audio portion comprising the overlaid translated audio speech segments.

10. The method of claim 9, wherein overlaying the translated audio speech segments of the set of translated audio speech segments onto the video segments of the video comprises:

for each translated audio speech segment of the set of translated audio speech segments:

determining whether timing information of the translated audio speech segment matches the timing information of a corresponding video segment;

upon determining the timing information of the translated audio speech segment does not match the timing information of the corresponding video segment, adjusting playback speed rate of the translated audio speech segment to match the timing information the translated audio speech segment to the timing information of the corresponding video segment; and overlaying the translated audio speech segment onto the corresponding video segment.

11. The method of claim 9, wherein overlaying the translated audio speech segments of the set of translated audio speech segments onto the video segments of the video comprises:

for each translated audio speech segment of the set of translated audio speech segments:

determining whether timing information of the translated audio speech segment matches the timing information of a corresponding video segment;

upon determining the timing information of the translated audio speech segment does not match the timing information of the corresponding video segment, adjusting playback speed rate of the corresponding video segment to match the timing information of the corresponding video segment to the timing information of the translated audio speech segment; and overlaying the translated audio speech segment onto the corresponding video segment.

12. A non-transitory machine-readable storage medium storing instructions which, when executed, cause a processing device to perform operations comprising:

identifying original caption data for a video, wherein the original caption data comprises a plurality of caption character strings associated with an audio portion of the video;

identifying speech recognition data generated for the audio portion of the video, the speech recognition data comprising a plurality of generated character strings and associated timing information for each generated character string;

mapping the plurality of caption character strings of the original caption data to the plurality of generated character strings of the speech recognition data using assigned values indicative of semantic similarities between individual caption character strings of the plurality of caption character strings of the original caption data and individual generated character strings of the plurality of generated character strings of the speech recognition data;

assigning timing information to the individual caption character strings of the original caption data based on timing information of mapped individual generated character strings of the speech recognition data; and aligning a translation of the original caption data with the audio portion of the video using the timing information assigned to the individual caption character strings of the original caption data based on the timing information of the mapped individual generated character strings of the speech recognition data.

13. The non-transitory machine-readable storage medium of claim 12, wherein the instructions comprise further instructions which, when executed, cause the processing device to perform the operations comprising prior to mapping the plurality of caption character strings to the plurality of generated character strings, normalizing the plurality of caption character strings and the plurality of generated character strings by removing non-spoken character strings.

14. The non-transitory machine-readable storage medium of claim 12, wherein mapping the plurality of caption character strings to the plurality of generated character strings using the assigned values indicative of semantic similarities between the individual caption character strings of the plurality of caption character strings and the individual generated character strings of the plurality of generated character strings comprises:

assigning an integer identifier value to each unique character string of the individual caption character strings of the plurality of caption character strings and each unique character string of the individual generated character strings of the plurality of generated character strings; and wherein a distance between a first integer identifier value associated with a first character string and a second integer identifier value associated with a second character string represents character differences between the first character string and the second character string.

15. The non-transitory machine-readable storage medium of claim 12, wherein mapping the plurality of caption character strings to the plurality of generated character strings using the assigned values comprises:

determining matching pairs of sequences of caption character strings in the plurality of caption character strings and sequences of generated character strings in the plurality of generated character strings using the assigned values of each individual caption character string of the plurality of caption character strings and each individual caption character string of the plurality of generated character strings; and mapping the individual caption character strings of the plurality of caption character strings to the individual generated character strings of the plurality of generated character strings based on the matching pairs of the sequences of caption character strings and the sequences of generated character strings.

16. The non-transitory machine-readable storage medium of claim 12, wherein aligning the translation of the original caption data with the audio portion of the video using the assigned timing information of the individual caption character strings comprises:

identifying translated language caption data for the video, wherein the translated language caption data comprises a plurality of translated character strings associated with the audio portion of the video;

generating a set of caption sentence fragments from the plurality of caption character strings and a set of translated sentence fragments from the plurality of translated character strings using punctuation in the plurality of caption character strings and the plurality of translated character strings;

mapping caption sentence fragments of the set of caption sentence fragments to corresponding translated sentence fragments of the set of translated sentence fragments based on timing associated with the original caption data and the translated language caption data;

estimating time intervals for individual caption sentence fragments of the set of caption sentence fragments using the assigned timing information of the individual caption character strings;

assigning time intervals to individual translated sentence fragments of the set of translated sentence fragments based on estimated time intervals of mapped individual caption sentence fragments;

generating a set of translated sentences using consecutive translated sentence fragments of the set of translated sentence fragments based on punctuation; and aligning the set of translated sentences with the audio portion of the video using assigned time intervals of individual translated sentence fragments from corresponding translated sentences.

17. The non-transitory machine-readable storage medium of claim 16, wherein the instructions comprise further instructions which, when executed, cause the processing device to perform the operations comprising:

identifying speech segment data for the video, wherein the speech segment data comprises a plurality of speech segments with speech timing information associated with the audio portion of the video; and updating the time intervals for the individual translated sentence fragments based on speech timing information associated with the plurality of speech segments.

18. The non-transitory machine-readable storage medium of claim 12, wherein aligning the translation of the original caption data with the audio portion of the video using the assigned timing information of the individual caption character strings comprises:

generating a set of caption sentence fragments from the plurality of caption character strings using punctuation in the plurality of caption character strings;

estimating time intervals for individual caption sentence fragments of the set of caption sentence fragments using the assigned timing information of the individual caption character strings;

generating a set of caption sentences using consecutive caption sentence fragments of the set of caption sentence fragments based on punctuation;

generating a set of translated sentences based on the set of caption sentences using machine translation and assigning timing information to each of the translated sentences based on estimated time intervals of corresponding caption sentences; and aligning the set of translated sentences with the audio portion of the video using the assigned timing information.

19. The machine-readable storage medium of claim 12, wherein the instructions comprise further instructions which, when executed, cause the processing device to perform the operations comprising:

obtaining translated audio speech that is machine-generated speech for the translation of the original caption data, wherein the translated audio speech comprises a set of translated audio speech segments;

overlaying translated audio speech segments of the set of translated audio speech segments onto video segments of the video that correspond to time intervals for each of the translated audio speech segments; and generating a second video containing a video portion of the video and a translated audio portion comprising the overlaid translated audio speech segments.

20. A system comprising:

a memory; and a processing device operatively coupled with the memory to:

identify original caption data for a video, wherein the original caption data comprises a plurality of caption character strings associated with an audio portion of the video;

identify speech recognition data generated for the audio portion of the video, the speech recognition data comprising a plurality of generated character strings and associated timing information for each generated character string;

map the plurality of caption character strings of the original caption data to the plurality of generated character strings of the speech recognition data using assigned values indicative of semantic similarities between individual caption character strings of the plurality of caption character strings of the original caption data and individual generated character strings of the plurality of generated character strings of the speech recognition data;

assign timing information to the individual caption character strings of the original caption data based on timing information of mapped individual generated character strings of the speech recognition data; and align a translation of the original caption data with the audio portion of the video using the timing information assigned to the individual caption character strings of the original caption data based on the timing information of the mapped individual generated character strings of the speech recognition data.

* * * * *

UNITED STATES PATENT AND TRADEMARK OFFICE

CERTIFICATE OF CORRECTION

PATENT NO. : 11,582,527 B2
APPLICATION NO. : 16/975696
DATED : February 14, 2023
INVENTOR(S) : Terrance Paul McCartney, Jr., Brian Colonna and Michael Nechyba It is certified that error appears in the above-identified patent and that said Letters Patent is hereby corrected as shown below:

On the Title Page

Item (54), and In the Specification, Column 1, Lines 1-2, delete "AUTOMATED VOICE TRANSLATION DUBBING FOR PRERECORDED VIDEO" and insert -- AUTOMATED VOICE TRANSLATION DUBBING FOR PRERECORDED VIDEOS --

Item (72), delete "Terrence Paul McCartney, Jr." and insert -- Terrance Paul McCartney, Jr. --

Signed and Sealed this
Eighteenth Day of July, 2023

Katherine Kelly Vidal

Katherine Kelly Vidal
*Director of the United States Patent and Trademark Office*